United States Patent
Hsu et al.

(10) Patent No.: US 11,506,984 B2
(45) Date of Patent: Nov. 22, 2022

(54) SIMULATION OF LITHOGRAPHY USING MULTIPLE-SAMPLING OF ANGULAR DISTRIBUTION OF SOURCE RADIATION

(71) Applicant: ASML Netherlands B.V., Veldhoven (NL)

(72) Inventors: Duan-Fu Stephen Hsu, Fremont, CA (US); Rafael C. Howell, Santa Clara, CA (US); Jianjun Jia, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 657 days.

(21) Appl. No.: 15/567,606

(22) PCT Filed: May 13, 2016

(86) PCT No.: PCT/EP2016/060891
§ 371 (c)(1),
(2) Date: Oct. 18, 2017

(87) PCT Pub. No.: WO2016/192964
PCT Pub. Date: Dec. 8, 2016

(65) Prior Publication Data
US 2018/0120709 A1    May 3, 2018

Related U.S. Application Data

(60) Provisional application No. 62/168,441, filed on May 29, 2015.

(51) Int. Cl.
*G03F 7/20* (2006.01)
*G06F 30/367* (2020.01)
*G06F 119/18* (2020.01)

(52) U.S. Cl.
CPC .......... *G03F 7/705* (2013.01); *G03F 7/70125* (2013.01); *G06F 30/367* (2020.01); *G06F 2119/18* (2020.01)

(58) Field of Classification Search
CPC .... G06F 7/705; G06F 30/376; G06F 7/70125; G06F 2119/18; G06F 30/367; G03F 7/705
See application file for complete search history.

(56) References Cited

U.S. PATENT DOCUMENTS 5,229,872 A    7/1993  Mumola
5,296,891 A    3/1994  Vogt et al.
(Continued)

FOREIGN PATENT DOCUMENTS

| KR | 10-2011-0021998 | 3/2011 |
|---|---|---|
| KR | 10-2013-0094836 | 8/2013 |
| WO | 2014/127985 | 8/2014 |

OTHER PUBLICATIONS

Mack, "Inside Prolith™ A Comprehensive Guide to Optical Lithography Simulation", 2005, v5.*
(Continued)

*Primary Examiner* — Chuen-Meei Gan
(74) *Attorney, Agent, or Firm* — Pillsbury Winthrop Shaw Pittman LLP

(57) ABSTRACT

A method including: determining a first simulated partial image formed, by a lithographic projection apparatus, from a first radiation portion propagating along a first group of one or more directions; determining a second simulated partial image formed, by the lithographic projection apparatus, from a second radiation portion propagating along a second group of one or more directions; and determining an image by incoherently adding the first partial image and the second partial image, wherein the first group of one or more
(Continued)

directions and the second group of one or more directions are different.

24 Claims, 20 Drawing Sheets

(56) References Cited

U.S. PATENT DOCUMENTS

| | | | |
|---|---|---|---|
| 5,523,193 A | 6/1996 | Nelson | |
| 5,969,441 A | 10/1999 | Loopstra et al. | |
| 6,046,792 A | 4/2000 | Van Der Werf et al. | |
| 7,587,704 B2 | 9/2009 | Ye et al. | |
| 8,200,468 B2 | 6/2012 | Ye et al. | |
| 8,584,056 B2 | 11/2013 | Chen et al. | |
| 8,786,824 B2 | 7/2014 | Hansen | |
| 2002/0035461 A1* | 3/2002 | Chang | G03F 1/84 703/13 |
| 2006/0244940 A1* | 11/2006 | Uehara | G03F 7/70891 355/69 |
| 2007/0002300 A1* | 1/2007 | Hansen | G03F 7/70325 355/67 |
| 2007/0028206 A1* | 2/2007 | Chou | G03F 1/36 716/51 |
| 2009/0157360 A1 | 6/2009 | Ye et al. | |
| 2010/0010784 A1 | 1/2010 | Cao et al. | |
| 2010/0141925 A1* | 6/2010 | Cao | G03F 7/705 355/77 |
| 2010/0315614 A1 | 12/2010 | Hansen | |
| 2011/0200946 A1* | 8/2011 | Mann | G03F 7/70475 430/312 |
| 2011/0230999 A1 | 9/2011 | Chen et al. | |
| 2012/0123581 A1* | 5/2012 | Smilde | G03F 7/70641 700/105 |
| 2013/0185042 A1 | 7/2013 | Taoka | |
| 2013/0346037 A1* | 12/2013 | Pierrat | G03F 7/70125 703/2 |
| 2014/0146311 A1* | 5/2014 | Mikami | G03F 7/70483 356/73 |
| 2017/0262564 A1* | 9/2017 | Liu | G03F 7/70433 |

OTHER PUBLICATIONS

Azpiros, "Analysis and Modeling of Photomask Near-Fields in Sub-wavelength Deep Ultraviolet Lithography with Optical Proximity Corrections", 2004.*
Chinese Office Action issued in corresponding Chinese Patent Application No. 201680031497.0, dated May 29, 2019.
Korean Notice of Allowance issued in corresponding Korean Patent Application No. 10-2017-7037321, dated Oct. 4, 2019.
Korean Office Action issued in corresponding Korean Patent Application No. 10-2017-7037321, dated Jun. 24, 2019.
International Search Report and Written Opinion dated Jun. 24, 2016 in corresponding International Patent Application No. PCT/EP2016/060891.
Konstantinos, Adam et al., "Hybrid Hopkins-Abbe method for modeling oblique angle mask effects in OPC," Proc. of SPIE, vol. 6924, pp. 69241E-1-69241E-12 (2008).
Spence, Chris, "Full-Chip Lithography Simulation and Design Analysis—How OPC Is Changing IC Design," Proc. SPIE, vol. 5751, pp. 1-14 (2005).
Rosenbluth, Alan E. et al., "Optimum mask and source patterns to print a given shape," J. Microlith., Microfab., Microsys., vol. 1, No. 1, pp. 13-30 (2002).
Granik, Yuri, "Source optimization for image fidelity and throughput," J. Microlith., Microfab., Microsys,, vol. 3, No. 4, pp. 509-522 (2004).
Socha, Robert et al., "Simultaneous Source Mask Optimization (SMO)," Proc. of SPIE, vol. 5853, pp. 180-193 (2005).
Liu, Peng et al., "Fast and accurate 3D mask model for full-chip OPC and verification," Proc. of SPIE, vol. 6520, pp. 65200R-1-65200R-12 (2007).
Liu, Peng et al., "Fast 3D thick mask model for full-chip EUVL simulations," Proc. of SPIE, vol. 8679, pp. 86790W-1-86790W-16 (2013).

* cited by examiner

SIMULATION OF LITHOGRAPHY USING MULTIPLE-SAMPLING OF ANGULAR DISTRIBUTION OF SOURCE RADIATION

CROSS-REFERENCE TO RELATED APPLICATIONS

This application is the U.S. national phase entry of PCT patent application no. PCT/EP2016/060891, which was filed on May 13, 2016, which claims the benefit of priority of U.S. application No. 62/168,441, which was filed on May 29, 2015, and which is incorporated herein in its entirety by reference.

BACKGROUND

A lithographic projection apparatus can be used, for example, in the manufacture of integrated circuits (ICs). In such a case, a patterning device (e.g., a mask) may contain or provide a circuit pattern corresponding to at least a part of an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic projection apparatus, one target portion at a time. In one type of lithographic projection apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic projection apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD = k_1 \times \lambda / NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or design layout. These include, for example, but not limited to, optimization of NA and optical coherence settings, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET).

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics $NA = \sin(\Theta_{max})$.

In a lithographic projection apparatus, a source provides illumination (i.e. light); projection optics direct and shapes the illumination via a patterning device and onto a substrate. The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components to shape, adjust and/or project radiation from the source before the radiation passes the patterning device, and/or optical components to shape, adjust and/or project the radiation after the radiation passes the patterning device. The projection optics generally exclude the source and the patterning device. For example, projection optics may include at least some of the components 14A, 16A*a*, 16A*b* and 16A*c*. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. Optical properties of the lithographic projection apparatus (e.g., properties of the source, the patterning device and the projection optics) dictate the aerial image.

SUMMARY

Disclosed herein is a computer-implemented method comprising: determining a first partial image formed from a first radiation portion propagating along a first group of one or more directions from an illumination source of a lithographic projection apparatus and impinging on a patterning device, the first partial image formed by a lithographic projection apparatus; determining a second partial image formed from a second radiation portion propagating along a second group of one or more directions from the illumination source of the lithographic projection apparatus and impinging on the patterning device, the second partial image formed by the lithographic projection apparatus; and determining, by computer simulation, an image by adding (e.g., incoherently adding) the first partial image and the second partial image, wherein the first group of one or more directions and the second group of one or more directions are different.

According to an embodiment, the first group of one or more directions and the second group of one or more directions do not include a same direction.

According to an embodiment, the image is a mask transmittance image.

According to an embodiment, the image is an aerial image.

According to an embodiment, the first and second radiation portions are from a source of the lithographic projection apparatus and the source is a discrete source.

According to an embodiment, first and second radiation portions are from a source of the lithographic projection apparatus and the source is a continuous source.

According to an embodiment, the method further comprises selecting the first group of one or more directions from a continuous area of a pupil of a source of the lithographic projection apparatus.

According to an embodiment, the first and second radiation portions are from an EUV source or a DUV source.

According to an embodiment, the first partial image and the second partial image are formed by a patterning device.

According to an embodiment, the patterning device is a reflective patterning device.

According to an embodiment, the patterning device is a transmissive patterning device.

According to an embodiment, the first radiation portion and the second radiation portion are oblique to a patterning device.

According to an embodiment, the first partial image and the second partial image are formed at least partially by a structure under a resist layer on a substrate.

According to an embodiment, the method further comprises adjusting one or more parameters of a patterning device based on the image.

According to an embodiment, the one or more parameters of the patterning device comprise: a number of assist features, a shape of an assist feature, a shape of a main feature, or any combination selected therefrom.

According to an embodiment, the method further comprises adjusting one or more parameters of the lithographic projection apparatus based on the image.

According to an embodiment, the one or more parameters of the lithographic projection apparatus comprise: a parameter of a source of the lithographic projection apparatus, a parameter of projection optics of the lithographic projection apparatus, a parameter of the first radiation portion, a parameter of the second radiation portion, or any combination selected therefrom.

According to an embodiment, the method further comprises computing a cost function based on a characteristic of the image.

Disclosed herein is a computer-implemented method comprising: searching in a database for a partial image of a pattern in a design layout, the partial image formed from a radiation portion propagating along a group of one or more directions; and if the partial image for the pattern is found in the database, constructing a partial image of the design layout, formed from the radiation portion, at least from the partial image of the pattern.

Disclosed herein is a computer-implemented method comprising: searching in a database for a transmission function for a pattern in a design layout, for a radiation portion propagating along a group of one or more directions; and if the transmission function is found in the database, constructing a partial image of the pattern using the transmission function found.

According to an embodiment, the method further comprises constructing a partial image of the design layout using the partial image of the pattern.

Disclosed herein is a computer-implemented method comprising: searching in a database for a transmission function of projection optics of a lithographic projection apparatus, for a radiation portion propagating along a group of one or more directions; and if the transmission function of the projection optics is found in the database, constructing a partial image of a design layout formed by the projection optics, for the radiation portion.

According to an embodiment, the method further comprises constructing an image of the design layout using the partial image of the design layout.

Disclosed herein is a computer program product comprising a computer readable medium having instructions recorded thereon, the instructions when executed by a computer implementing any of the methods described herein.

DETAILED DESCRIPTION

The fine tuning steps applied to the lithographic projection apparatus or design layout often rely on the knowledge of how the manufacturing processes (e.g., semiconductor manufacturing processes) behave under various conditions. The knowledge may certainly be from many experiments but running experiments is often expensive and time-consuming. Another source of the knowledge is simulation. Simulation does not have to involve physical samples and the conditions may be easily varied. However, simulation uses mathematical models and no mathematical model can account for all physical and chemical processes. Therefore, a compromise is often made between the accuracy of the simulation and the resources the simulation uses. Namely, a certain amount of inaccuracy of the simulation and the resultant inaccuracy of the fine tuning is tolerated in order to reduce the resources the simulation uses. Nevertheless, inaccuracy in the simulation does negatively impact the fine tuning steps relying on the simulation. The tolerable inaccuracy may depend on the device being made by the manufacturing processes. For example, devices with larger feature sizes and spacing may tolerate larger inaccuracy. Conversely, the same amount of inaccuracy tolerable in one type of devices may be intolerable in another type.

Figure 1:
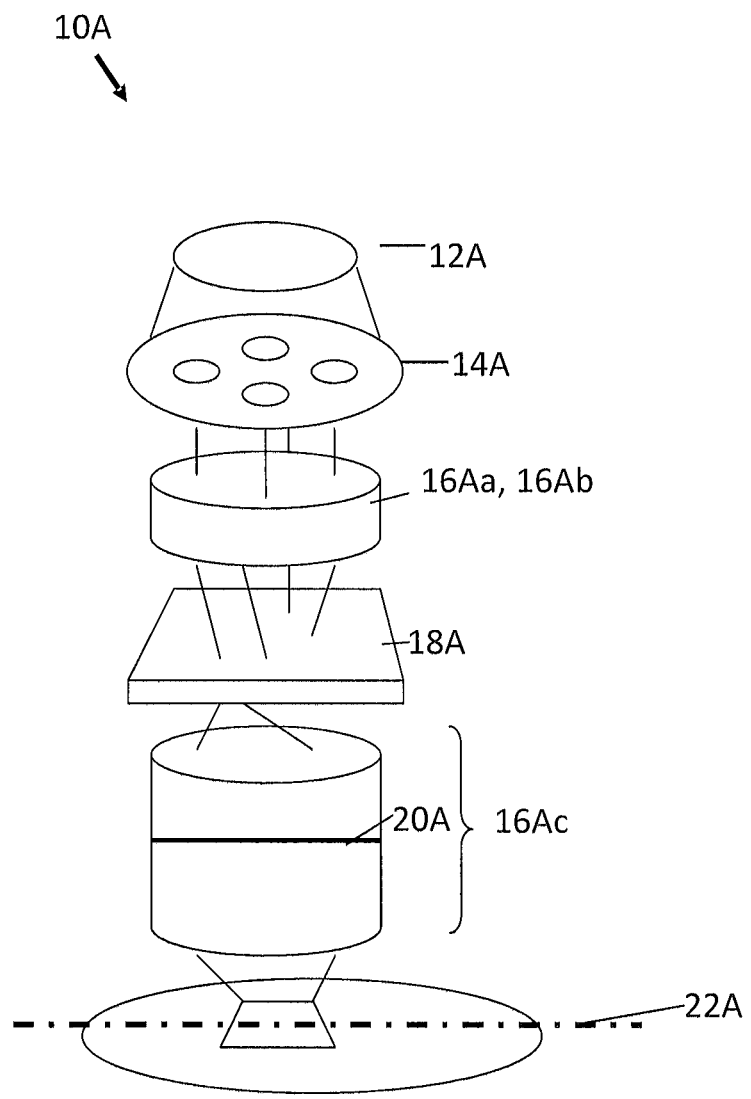
FIG. 1 is a block diagram of various subsystems of a lithography system.
Figure 2:
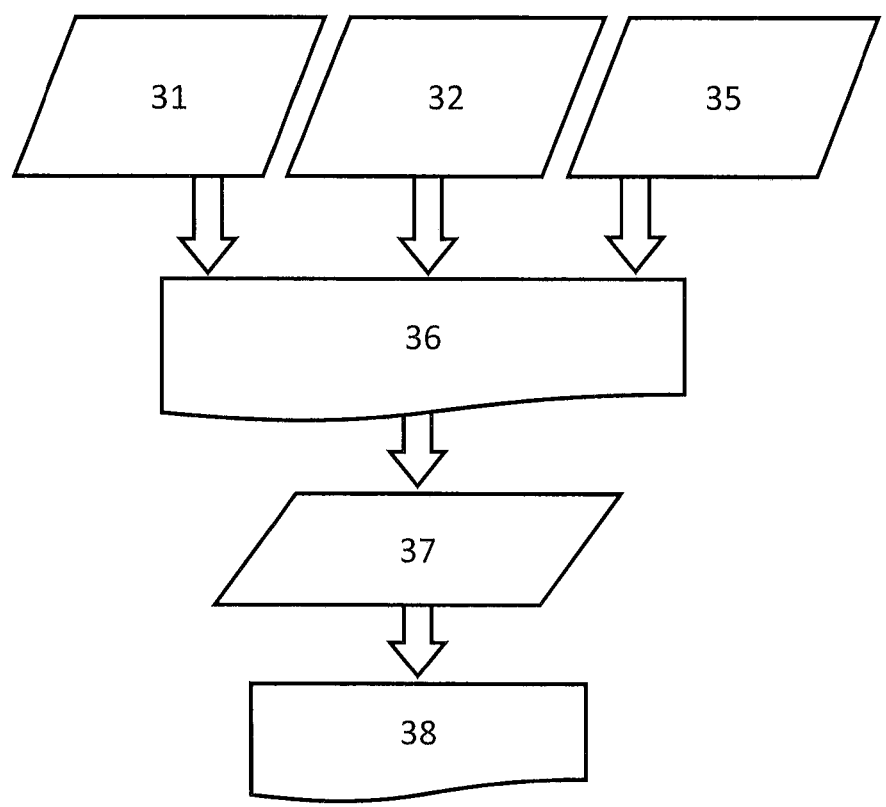
FIG. 2 is a block diagram of simulation models corresponding to the subsystems in FIG. 1.

As an example of simulation of the manufacturing processes, a flow chart for simulating lithography in a lithographic projection apparatus (e.g., the apparatus in FIG. 1) is illustrated in FIG. 2. A source model 31 represents optical characteristics (including radiation intensity distribution and/or phase distribution) of the source. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout 33) of a design layout, which is the representation of an arrangement of features on or formed by a patterning device. Since the patterning device used in the lithographic projection apparatus can be changed, it is desirable to separate the optical properties of the patterning device from the optical properties of the rest of the lithographic projection apparatus including at least the source and the projection optics. An aerial image 36 can be simulated from the design layout model 35, the projection optics model 32 and the design layout model 35. A resist image 38 can be simulated from the aerial image 36 using a resist model 37. An example of the resist model can be found in commonly assigned U.S. Patent Application Publication No. 2009-0157360, the disclosure of which is hereby incorporated by reference herein in its entirety. The resist model is related only to properties of the resist layer (e.g., effects of chemical processes which occur during exposure, post-exposure bake (PEB) and development).

More specifically, it is noted that the source model 31 can represent the optical characteristics of the source that include, but not limited to, numerical aperture (NA)-sigma ($\sigma$) settings as well as any particular illumination source shape (e.g. off-axis radiation sources such as annular, quadrupole, and dipole, etc.). The projection optics model 32 can represent the optical characteristics of the of the projection optics that include aberration, distortion, refractive indexes, physical sizes, physical dimensions, etc. The design layout model 35 can also represent physical properties of a physical patterning device, as described, for example, in U.S. Pat. No. 7,587,704, which is incorporated by reference herein in its entirety. The objective of the simulation is to accurately predict, for example, edge placements, aerial image intensity slopes and critical dimensions (CDs), which can then be compared against an intended design. The intended design is generally defined as a pre-optical proximity correction (OPC) design layout which can be provided in a standardized digital file format such as GDSII or OASIS or other file format.

From this design layout, one or more portions may be identified, which are referred to as "clips". In an embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as machine vision) or manual algorithm that identifies the critical feature areas.

As an example of the fine tuning steps applied to the lithographic projection apparatus or design layout, OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Furthermore, masks and reticles can be broadly termed "patterning devices." Also, person skilled in the art will recognize that, especially in the context of lithography simulation/optimization, the term "mask," "patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake, resist development, and etching that generally follow lithography.

In order to ensure that the projected image of the design layout is in accordance with requirements of a given target circuit design, proximity effects should be simulated (e.g., by using the flow of FIG. 2) and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

The illumination source can also be optimized, either jointly with patterning device optimization or separately, in an effort to improve the overall lithography fidelity. The terms "illumination source" and "source" are used interchangeably in this document. Many off-axis illumination sources, such as annular, quadrupole, and dipole, may be used, and provide more freedom for OPC design, thereby improving the imaging results. Off-axis illumination is a way to resolve fine structures (i.e., target features) contained in the patterning device. However, when compared to a traditional illumination source, an off-axis illumination source usually provides less radiation intensity for the aerial image (AI). Thus, it becomes desirable to attempt to optimize the illumination source to achieve the optimal balance between finer resolution and reduced radiation intensity.

Numerous illumination source optimization approaches can be found, for example, in an article by Rosenbluth et al., titled "Optimum Mask and Source Patterns to Print A Given Shape", Journal of Microlithography, Microfabrication, Microsystems 1(1), pp. 13-20, (2002). In another example set forth in an article by Granik, titled "Source Optimization for Image Fidelity and Throughput", Journal of Microlithography, Microfabrication, Microsystems 3(4), pp. 509-522, (2004), several existing source optimization approaches are overviewed.

For low $k_1$ photolithography, optimization of both the source and patterning device is useful to ensure a viable process window for projection of critical circuit patterns. Some algorithms (e.g. Socha et. al. Proc. SPIE vol. 5853, 2005, p. 180) discretize illumination into independent source points and the patterning device pattern into diffraction orders in the spatial frequency domain, and separately formulate a cost function (which is defined as a function of selected design variables) based on process window metrics such as exposure latitude which could be predicted by optical imaging models from source point intensities and patterning device diffraction orders. The term "design variables" as used herein comprises a set of parameters of a lithographic projection apparatus, for example, parameters a user of the lithographic projection apparatus can adjust. It should be appreciated that any characteristics of a lithographic projection process, including those of the source, the patterning device, the projection optics, and/or resist characteristics can be among the design variables in the optimization. The cost function is often a non-linear function of the design variables. Then standard optimization techniques are used to minimize the cost function.

A source and patterning device optimization method and system that allows for simultaneous optimization of the source and patterning device using a cost function without constraints and within a practicable amount of time is described in U.S. Patent Application Publication No. 2011-0230999, which is hereby incorporated by reference herein in its entirety. An additional source and patterning device optimization method and system that involves optimizing the source by adjusting pixels of the source is described in U.S. Patent Application Publication No. 2010-0315614, which is hereby incorporated by reference herein in its entirety.

In an optimization process of a system, a figure of merit of the system can be represented as a cost function. The optimization process boils down to a process of finding a set of parameters (design variables) of the system that, for example, minimizes or maximizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (i.e., worst deviation). The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

Another example of the fine tuning steps applied to the lithographic projection apparatus or design layout addresses the fact that images (e.g., resist image, aerial image) formed by radiation propagating along different directions may be different. Such difference may exist in manufacturing processes using either DUV or EUV radiation. One source of this difference is that the features on the patterning device have a finite thickness. Another source is that the substrate has structures of a finite thickness under a resist.

Figure 3A:
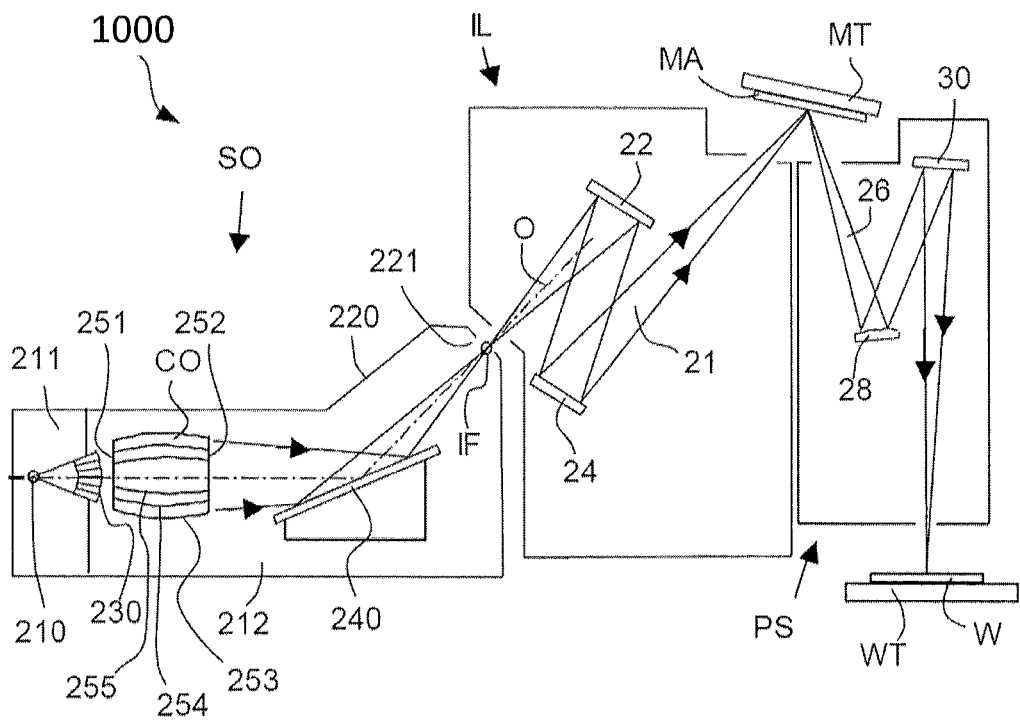
FIG. 3A schematically shows that radiation from a source of a lithographic projection apparatus impinging on a patterning device or a substrate, according to an embodiment.

FIG. 3A schematically shows that radiation from a source of a lithographic projection apparatus 1000 impinging on a patterning device or a substrate may include radiation propagating along different directions and that the intensity of the radiation may depend on the directions. Although the lithographic projection apparatus 1000 depicted in FIG. 3A has an EUV source, a lithographic projection apparatus using other wavelengths can also have the radiation incident on a patterning device or a substrate from different directions.

The lithographic projection apparatus 1000 includes:
a source collector module SO
an illumination system (illuminator) IL configured to condition a radiation beam B (e.g. EUV radiation).
a support structure (e.g. a mask table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection optics (e.g. a reflective projection optics) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the mask may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

The illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, for providing the laser beam exciting the fuel. The resulting plasma emits output radiation, e.g., EUV radiation, which is collected using a radiation collector, disposed in the source collector module. The source/laser and the source collector module may be separate entities, for example when a $CO_2$ laser is used to provide the laser beam for fuel excitation.

In such cases, the source/laser is not considered to form part of the lithographic apparatus and the radiation beam is passed from the source/laser to the source collector module with the aid of a beam delivery system comprising, for example, suitable directing mirrors and/or a beam expander. In other cases the source/laser may be an integral part of the source collector module, for example when the source is a discharge produced plasma EUV generator, often termed as a DPP source.

Figure 3B:
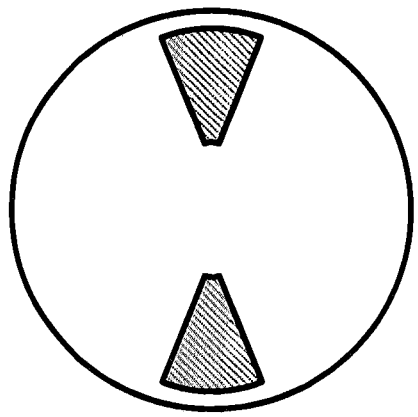
FIG. 3B, FIG. 3C, FIG. 3D and FIG. 3E show three examples of angular intensity distributions of the radiation from the source, according to an embodiment.
Figure 3C:
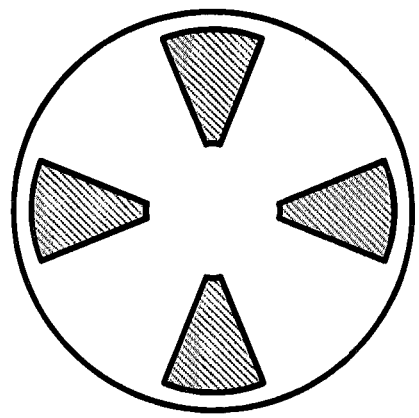
Figure 3D:
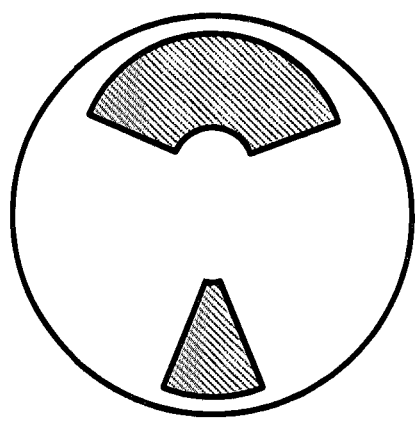
Figure 3E:
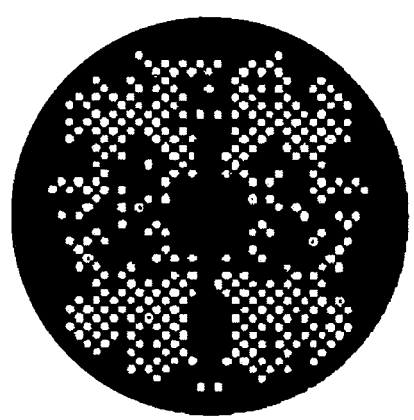

The illuminator IL may comprise an adjuster configured to adjust the angular intensity distribution of the radiation from the source. The angular intensity distribution may be represented by a pupil image (i.e., an image at the rear focus plane of the illuminator IL). The illuminator IL may comprise various other components, such as facetted field and pupil mirror devices. The illuminator may be used to condition the radiation from the source, to have a desired uniformity and intensity distribution in its cross section. FIG. 3B, FIG. 3C, FIG. 3D and FIG. 3E show three examples of angular intensity distributions of the radiation from the source. FIG. 3B is a dipole source. FIG. 3C is a quadruple source. FIG. 3D is an asymmetric source. FIG. 3E is a discrete source.

The radiation conditioned by the illuminator IL may include radiation propagating along many different directions. An aperture may block radiation propagating along certain directions and pass radiation propagating along other directions. The radiation along a plurality of directions may incident on the patterning device MA, which is held on the support structure (e.g., mask table) MT, and is patterned by the patterning device. After being redirected from the patterning device (e.g. mask) MA, the radiation may still include radiation propagating along multiple directions, and passes through the projection optics PS, which focuses the radiation onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

Figure 4A:
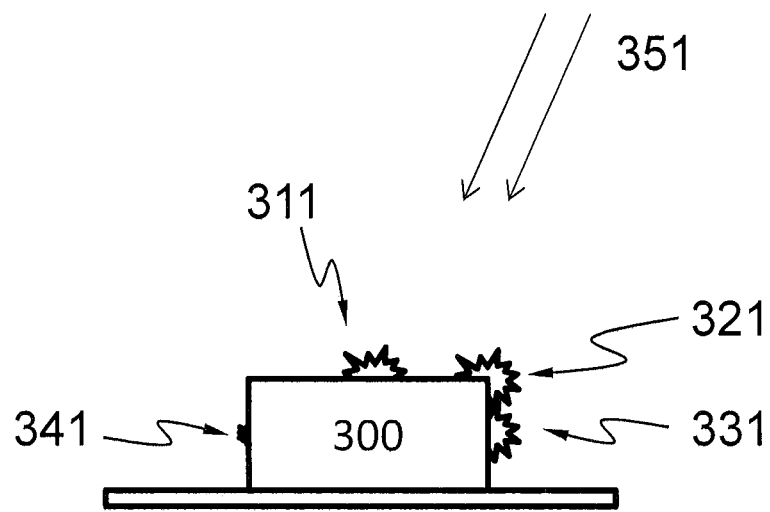
FIG. 4A and FIG. 4B schematically show that radiation propagating along different directions may interact with a feature (either on a patterning device or a substrate) differently due to scattering, according to an embodiment.
Figure 4B:
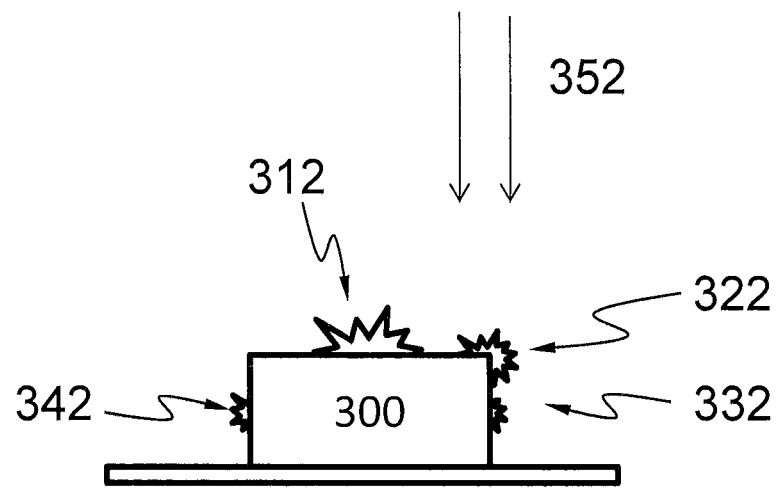

FIG. 4A and FIG. 4B schematically show that radiation propagating along different directions may interact with a feature 300 (either on a patterning device or a substrate) differently due to scattering. Scattering may be significant when the feature has a finite thickness and may impact the image formed by or near the feature. In FIG. 4A, radiation is incident on the feature 300 along direction 351; in FIG. 4B, radiation is incident on the feature 300 along direction 352. Direction 352 is perpendicular to a top surface and parallel to side surfaces of the feature 300. Direction 351 is not perpendicular or parallel to the top surface or side surfaces. Scattering 311 from the top surface in FIG. 4A may be weaker than scattering 312 from the top surface in FIG. 4B because the top surface is perpendicular to the radiation in FIG. 4A but not to the radiation in FIG. 4B. Scattering 321 from an edge between the top surface and one of the side surfaces in FIG. 4A may be stronger than scattering 322 from the top surface and one of the side surfaces in FIG. 4B because the edge is leading against the radiation in FIG. 4A but not so against the radiation in FIG. 4B. Scattering 331 from a side surface partially facing the radiation in FIG. 4A may be stronger than scattering 332 from a side surface parallel to the radiation in FIG. 4B. Scattering 341 from a side surface partially trailing the radiation in FIG. 4A may be weaker than scattering 342 from a side surface parallel to the radiation in FIG. 4B.

Figure 5A:
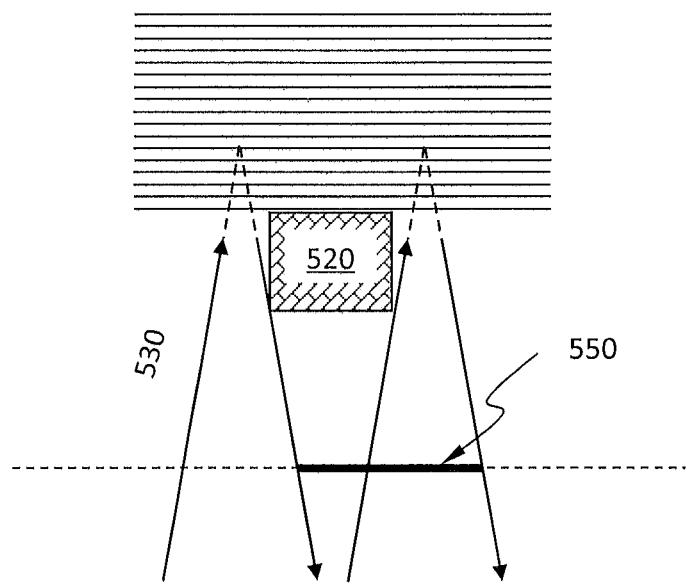
FIG. 5A and FIG. 5B schematically show that radiation propagating along different directions may interact with a feature differently due to shadowing effects, according to an embodiment.
Figure 5B:
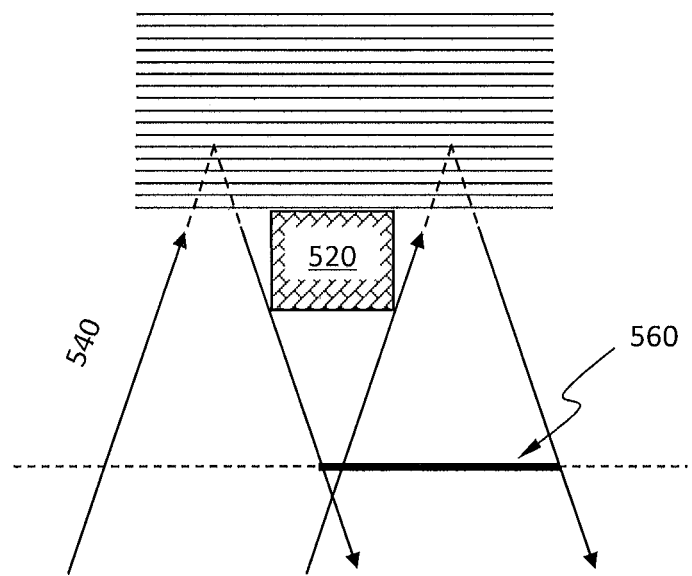

FIG. 5A and FIG. 5B schematically show that radiation propagating along different directions may interact with a feature 520 differently due to shadowing effects. As schematically illustrated in FIG. 5A, the feature 520 blocks incident radiation propagating along a direction 530 within a width 550 (i.e., casts a shadow of the width 550). As schematically illustrated in FIG. 5B, the same feature 520 blocks incident radiation propagating along a direction 540 within a width 560 (i.e., casts a shadow of the width 560). The width 560 is greater than the width 550 because the direction 540 is more oblique than the direction 530. Therefore, the image formed by the same feature 520 from radiation propagating along different directions may have different width.

Figure 6:
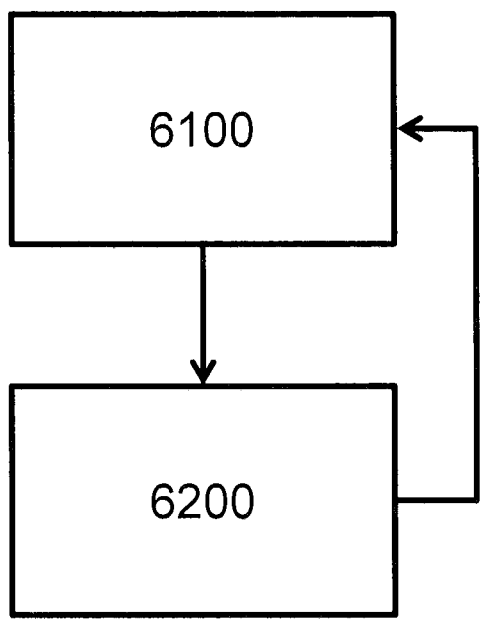
FIG. 6 schematically shows a flow chart for a fine tuning step applied to the lithographic projection apparatus or design layout, according to an embodiment.

FIG. 6 schematically shows a flow chart for a fine tuning step applied to the lithographic projection apparatus or design layout. In step 6100, the behavior (e.g., a characteristic of a product, or an image) of a manufacturing process is simulated under a condition. In step 6200, the condition is adjusted based on the simulated behavior. These two steps may be carried out reiteratively, until a termination criterion is met. The condition may include the positions or shapes of features of the design layout, characteristics of the source, and/or characteristics of the projection optics. The condition may be adjusted by calculating a cost function of one or more evaluation points (e.g., edge placement error (EPE), process window, throughput). In an example, the simulation can simulate topography effects of the patterning device. The behavior of the manufacturing process may include an image. The formation of an image may be a result of many physical effects, such as topography effects of the substrate and topography effects of the patterning device. The simulation of the behavior may take into account all possible directions along which radiation propagates (i.e., rigorous simulation). Rigorous simulation is more accurate but uses a larger amount of resources. Alternatively, the simulation of the behavior may be conducted under an assumption that the radiation from the source propagates along a single direction ("single direction assumption"). The simulation under the single direction assumption is less demanding of resources but may not be sufficiently accurate. If the simulation under the single direction assumption is accurate, the behavior so simulated should at least be qualitatively similar to the behavior simulated with more than one propagation direction accounted for (e.g., simulated rigorously).

Figure 7A:
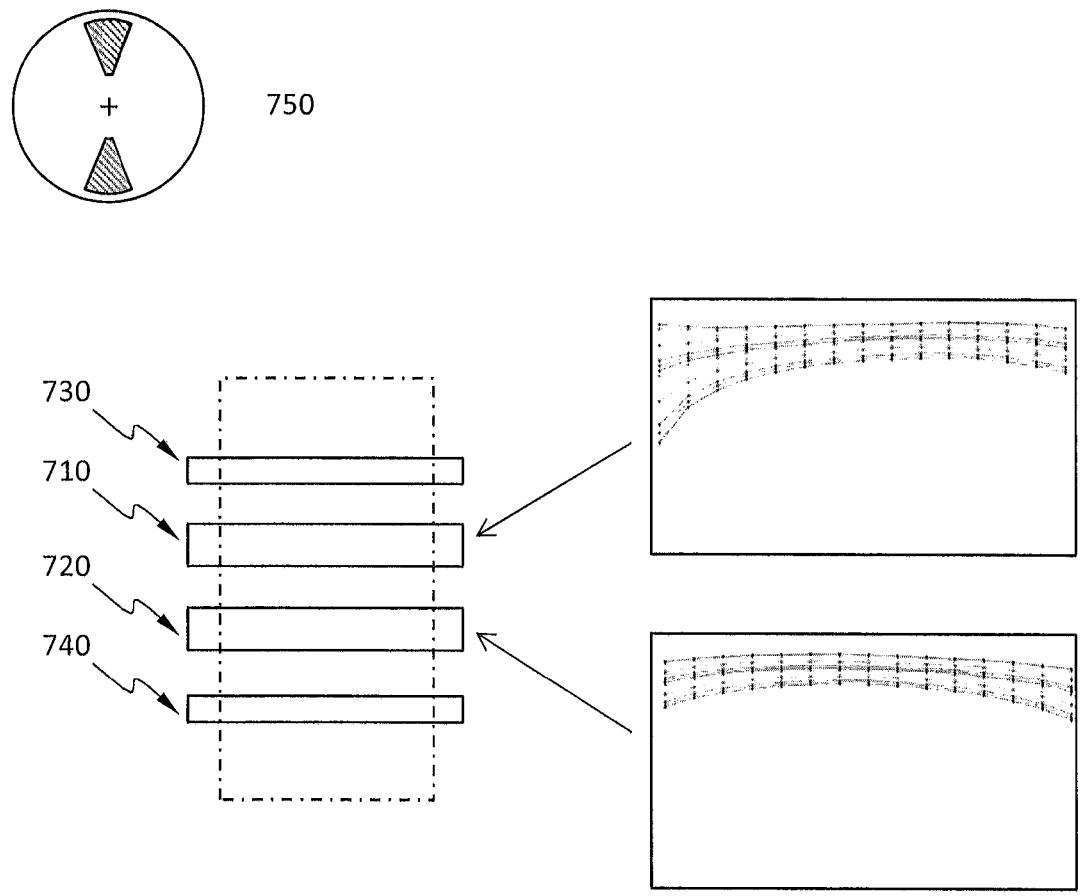
FIG. 7A and FIG. 7B below show that the behavior simulated under the single direction assumption may be qualitatively different from the behavior simulated with two propagation directions accounted for, according to an embodiment.
Figure 7B:
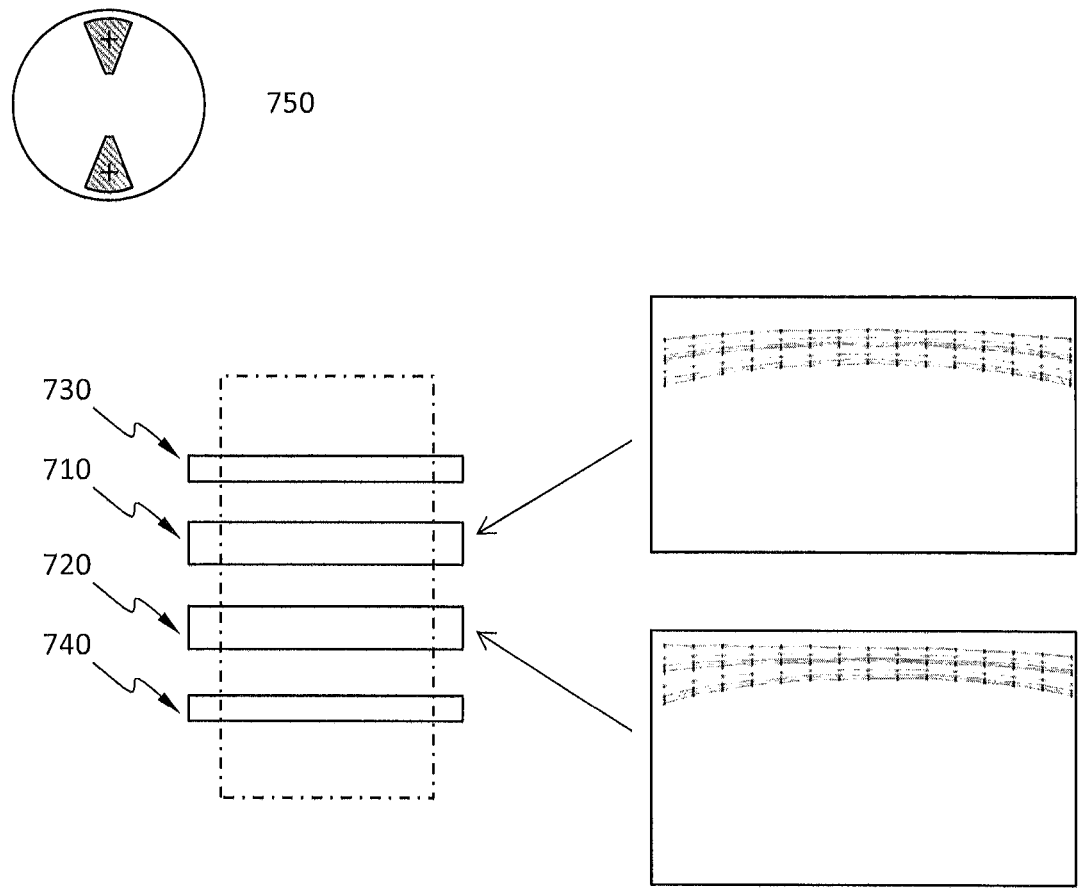

FIG. 7A and FIG. 7B below show that the behavior simulated under the single direction assumption may be qualitatively different from the behavior simulated with two propagation directions accounted for.

FIG. 7A shows Bossung curves (50 nm±70 nm defocus, ±10% delta dose) obtained from simulated images of two long rectangular features 710 and 720 with presence of two assist features 730 and 740. The simulated images are simulated under the condition of a dipole source 750 under the single direction assumption (the direction marked by the crosshair in the source pupil). The simulation of the images under the single direction assumption may be based on the model:

$$I(\vec{x}) = \Sigma_{\vec{f}',\vec{f}'',\vec{f}_{inc},pol} s_{pol}(\vec{f}_{inc}) t_{pol}(\vec{f}') t^*_{pol}(\vec{f}'') P_{pol}(\vec{f}') P^*_{pol}(\vec{f}'') e^{2\pi i j (\vec{f}'-\vec{f}'') \cdot \vec{x}}.$$

pol is polarization of the radiation; $\vec{f}_{inc}$ is the direction of propagation of the radiation; $s_{pol}$ is the source radiation intensity as a function of the direction of propagation, which may be represented by the source pupil; $P_{pol}$ is the transmission function (e.g., electric field of the diffraction pattern) of the projection optics; and $t_{pol}$ is the transmission function (e.g., electric field of the diffraction pattern) of the patterning device (e.g., including features 710-740). The single direction assumption is reflected in that $t_{pol}$ and $P_{pol}$ do not depend on $\vec{f}_{inc}$. $t_{pol}$ and $P_{pol}$ may be calculated under the single direction assumption—all the radiation from the source propagates along a single direction (e.g., the propagation direction marked by the crosshair).

FIG. 7B shows Bossung curves (50 nm±70 nm defocus, ±10% delta dose) obtained from simulated images of the same two long rectangular features 710 and 720 with presence of the same two assist features 730 and 740, except that the simulated images are simulated under the condition of the same dipole source 750, with two propagation directions (marked by the crosshairs in the source pupil) of radiation from the dipole source 750 accounted for. The Bossung curves in FIG. 7A are qualitatively dissimilar from the Bossung curves in FIG. 7B, which indicates that the simulation under the single direction assumption is not quite accurate. The simulation of the images with multiple propagation directions accounted for may be based on the model:

$$I(\vec{x}) = \Sigma_i I_i(\vec{x}) = \Sigma_i \Sigma_{\vec{f}',\vec{f}'',\vec{f}_{inc},pol} s_{pol,i}(\vec{f}_{inc}) t_{pol,i}(\vec{f}') t^*_{pol,i}(\vec{f}'') P_{pol,i}(\vec{f}') P^*_{pol,i}(\vec{f}'') e^{2\pi i j (\vec{f}'-\vec{f}'') \cdot \vec{x}}.$$

where $s_{pol,i}$ is the source radiation intensity of the i-th portion of the source pupil, as a function of the propagation direction; and $\vec{f}_{inc}$. $I_i(\vec{x})$ is a partial image formed by the radiation in the i-th portion of the source pupil alone. Different portions of the source pupil may not have any common direction (i.e., different portions do not overlap at all). The i-th portion of the source pupil may be an area immediately around the point represented by $\vec{f}_{inc}^{\ i}$ on the source pupil, where $\vec{f}_{inc}^{\ i}$ is a representative propagation direction of the radiation in the i-th portion. The multiple propagation directions are accounted for because the transmission function of the patterning device and the transmission function of the projection optics may be different for different portions. A transmission specific to a portion of the source pupil captures the transmission characteristics of radiation in that portion by the patterning device or projection optics.

Figure 8:
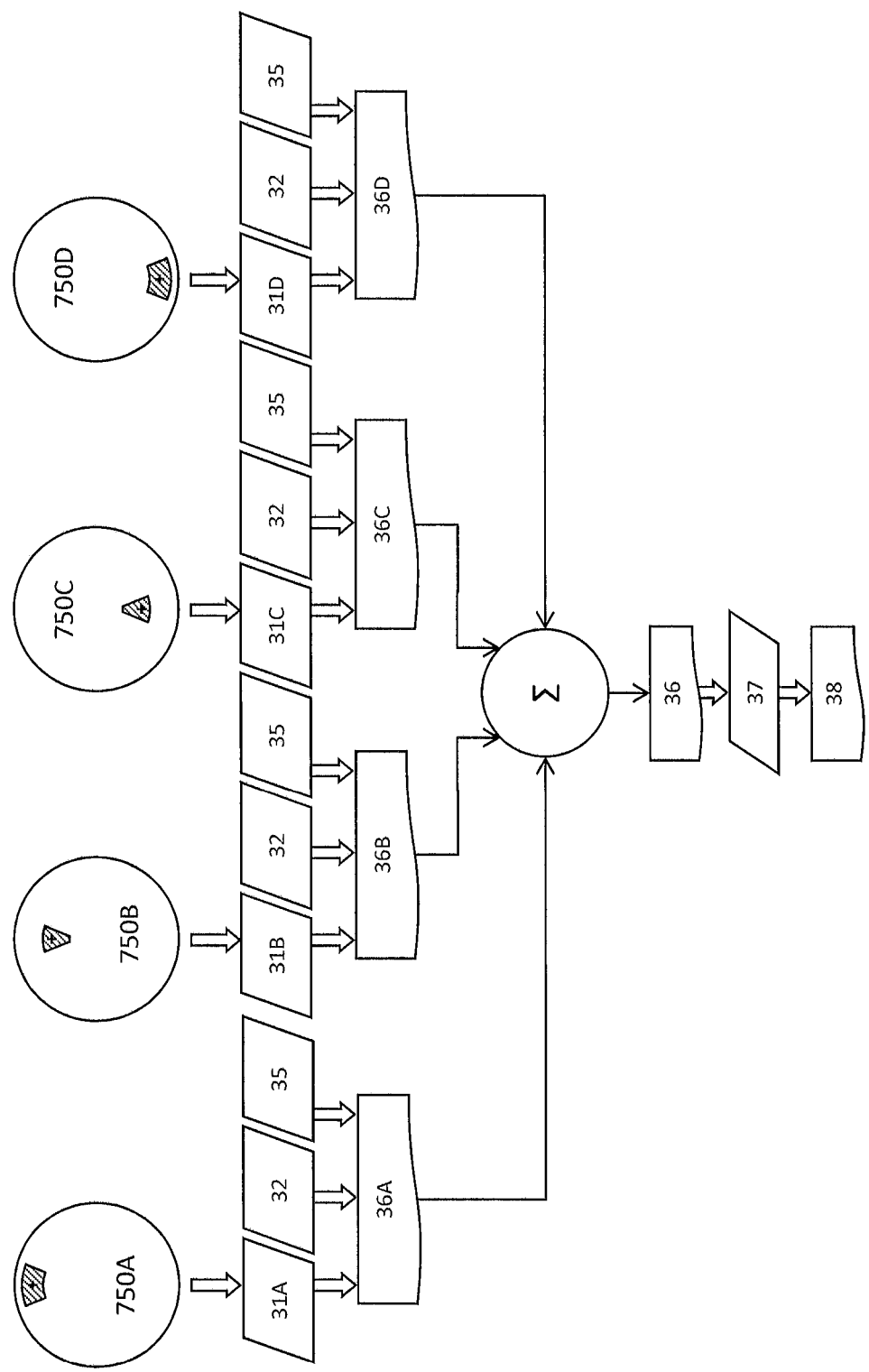
FIG. 8 schematically shows a flow chart for simulating an image by incoherently adding partial images, according to an embodiment.

FIG. 8 schematically shows a flow chart for simulating an image by incoherently adding partial images, according to an embodiment. The source pupil (e.g., the dipole pupil 750 in FIG. 7A and FIG. 7B) may be divided into a plurality of portions ("slices") such as portions 750A, 750B, 750C, 750D in this example. By definition, a point on the source pupil represents intensity of the radiation propagating along a single direction. Therefore, a portion on the source pupil is intensity of the radiation propagating along a group of directions. The source pupil sometimes may be simply called the "illumination." Within a portion, the radiation intensity is not necessarily uniform. Each portion is not necessarily localized. For each portion, a representative direction may be selected (e.g., by averaging some or all points in the portion). A partial image for each portion may be simulated without regard to other portions. Namely, the partial image for a portion is an image produced as if the source pupil has only that portion. The partial image for a portion may be simulated using only the propagation directions in that portion. The partial image for a portion may be simulated using all or some of the propagation directions in that portion, or using the representative direction selected for that portion. The image produced by the whole source may then be obtained by incoherently adding the partial images (i.e., adding the intensities of the partial images) because radiation propagating along different directions may not be coherent. The image and partial images may be a spatial intensity distribution on any suitable surface. For example, they may be an aerial image on the substrate, a mask transmittance image (an intensity or electric field distribution of the radiation after the patterning device), or any spatial intensity distribution on a surface between the patterning device and the substrate. The source may be an EUV or DUV source. The images and the partial images may be images formed by a patterning device before the radiation reaches a substrate. The images and the partial images may be images formed at least partially by a structure under (e.g., covered by) a resist layer on a substrate. A structure under a resist layer may be a structure with a finite height and protrudes into the resist layer. The partial images may be partial images of the entirety or a portion of the design layout. The design layout may include one or more assist features (features not intended to be printed onto a substrate but intended to affect printing of other features). A partial image of the entirety of the design layout formed from a radiation portion propagating along a group of directions may be obtained by incoherently adding the partial images of all portions of the design layout formed from the same radiation portion.

The source may be a continuous source (the source pupil is not pixelated) or a discrete source (the source pupil is pixelated). Each portion may be a continuous area (i.e., not a combination of two distinct and disconnected areas) on the source pupil.

In the example of FIG. 8, for each of the portions 750A, 750B, 750C and 750D, a partial source model (31A, 31B, 31C and 31D, respectively) may be constructed. Using the partial source model, a suitable projection optics model 32 and a suitable design layout model 35, partial aerial images (36A, 36B, 36C and 36D, respectively) may be simulated. The partial aerial images may then be incoherently added (i.e., intensity of the partial aerial images added without any interference effect) to obtain the aerial image 36 produced by the entire source pupil 750. A resist image 38 can be simulated from the aerial image 36 using a resist model 37.

Figure 9:
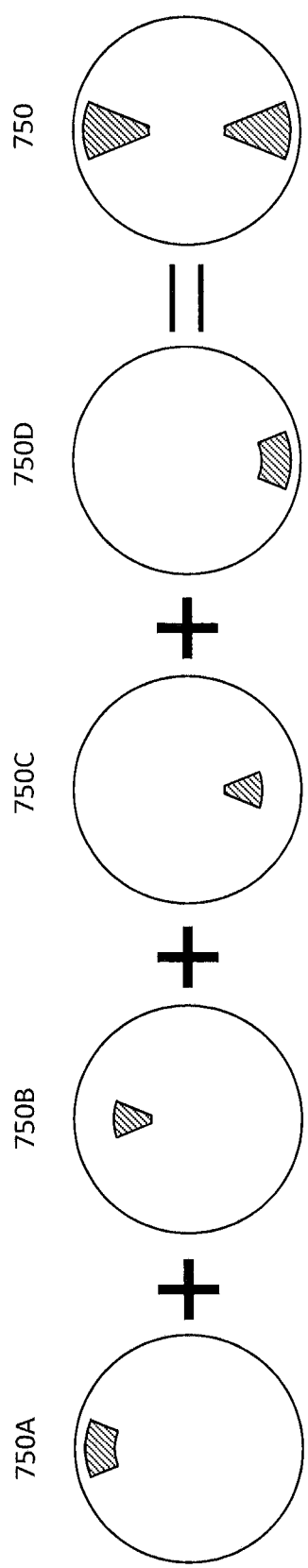
FIG. 9 shows that each area of the source pupil that has non-zero intensity may be included in a portion used to simulate a partial image, according to an embodiment.

FIG. 9 shows that each area of the source pupil that has non-zero intensity may be included in a portion used to simulate a partial image. It is possible that not all areas having non-zero intensity are included in a portion used to simulate a partial image.

Figure 10:
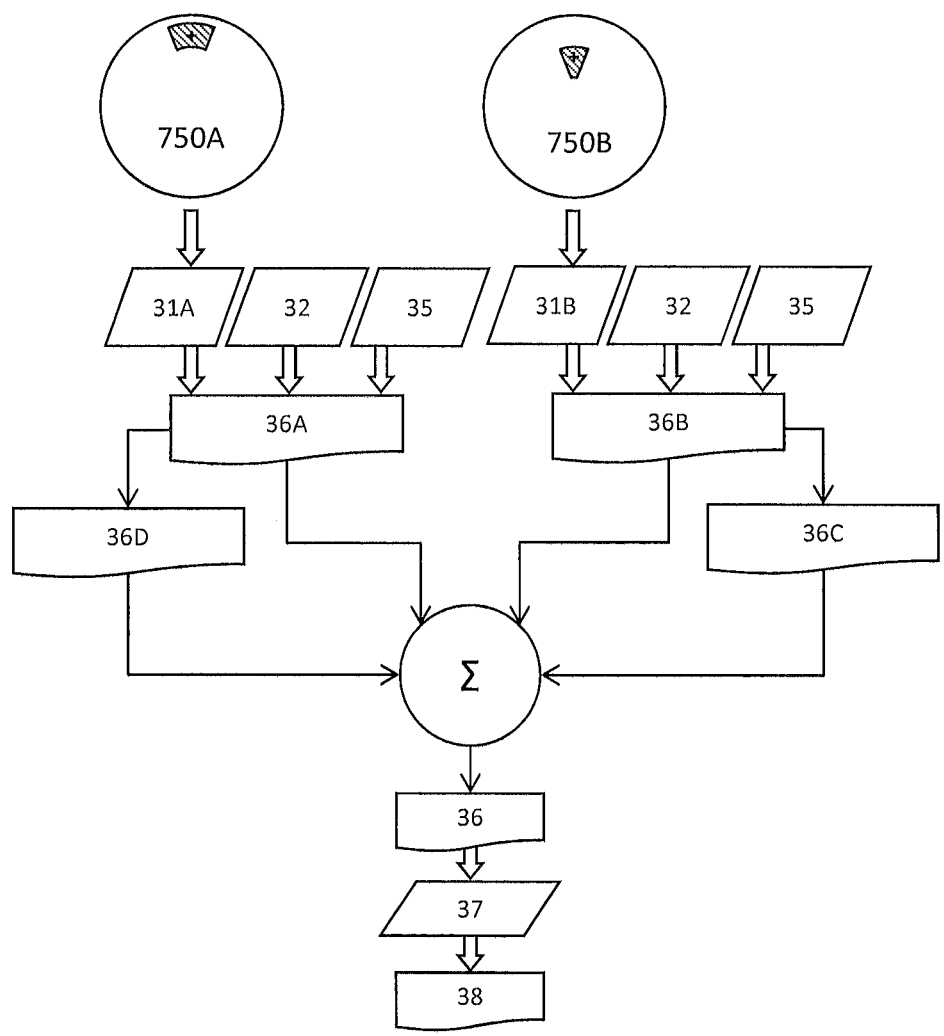
FIG. 10 shows a simplified version of the flow in FIG. 8, where symmetry is used to reduce the amount of simulation, according to an embodiment.

FIG. 10 shows a simplified version of the flow in FIG. 8, where symmetry is used to reduce the amount of simulation. For example, if two portions of the source pupil are symmetric with respect to a feature on the patterning device or the substrate (e.g., 750A may be symmetric to 750D, 750B may be symmetric to 750C), it may be sufficient to simulate a partial image for one (e.g., 750A) of the two portions and derive a partial image for the other (e.g., 750D) using symmetry without simulation. For example, in the flow of FIG. 10, a partial aerial image 36A is simulated for portion 750A and a partial aerial 36D is derived using symmetry for portion 750D without simulation. One example to which the flow of FIG. 10 may be applied is a double-sided telecentric optical system for DUV radiation. Such a system has symmetry at patterning device side, substrate side or both.

Figure 11:
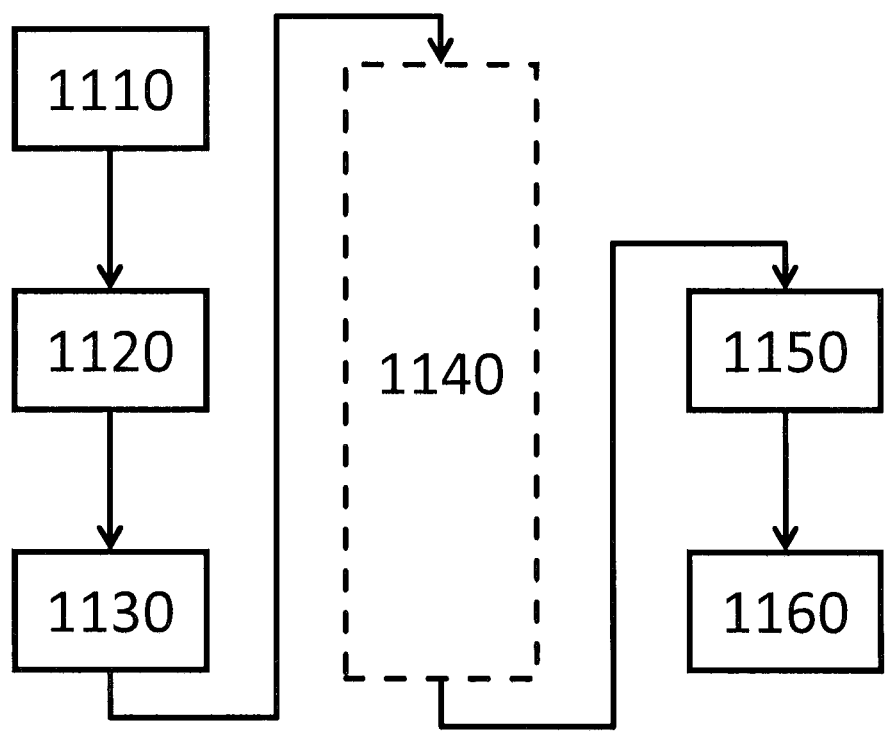
FIG. 11 shows an example flow using the methods of FIG. 8 or FIG. 10, according to an embodiment.

FIG. 11 shows an example flow using the methods of FIG. 8 or FIG. 10. In 1110, a continuous source (which may be represented by an intensity and/or phase distribution at a plane below the source, such as the pupil plane) and a design layout are co-optimized using the aerial image 36 or resist image 37 obtained by the methods of FIG. 8 and FIG. 10. For example, a cost function may be used in the co-optimization, where the cost function is a function of one or more characteristics of the aerial image 36 or resist image 37. The number and locations on the pupil of the radiation portions may be design variables in the co-optimization.

In 1120, the dose of the lithographic process may be optimized based on the source and design layout obtained in 1110.

In 1130, the focus is optimized using the source and design layout obtained in 1110. This step allows adjustment of the focus to accommodate changes to the source and design layout caused by the optimization in 1110.

In optional 1140, the continuous source obtained in 1110 is mapped to a discrete source. The discrete source and the design layout may be again co-optimized using the methods of FIG. 8 and FIG. 10.

In step 1150, the design layout may be optimized for each of a number of slit positions of the source at the patterning device. In an EUV lithographic apparatus, the through slit aberration tends to vary with the slit position. The slit aberration may be due to many effects such as substrate defocus, dose drift, patterning device dimension change, heating, etc. This step allows compensation for the slit aberration. For example, a cost function that measures evaluation points for varying slit positions may be used in this step.

In optional step 1160, a process window is determined for each of the slit positions.

Figure 12:
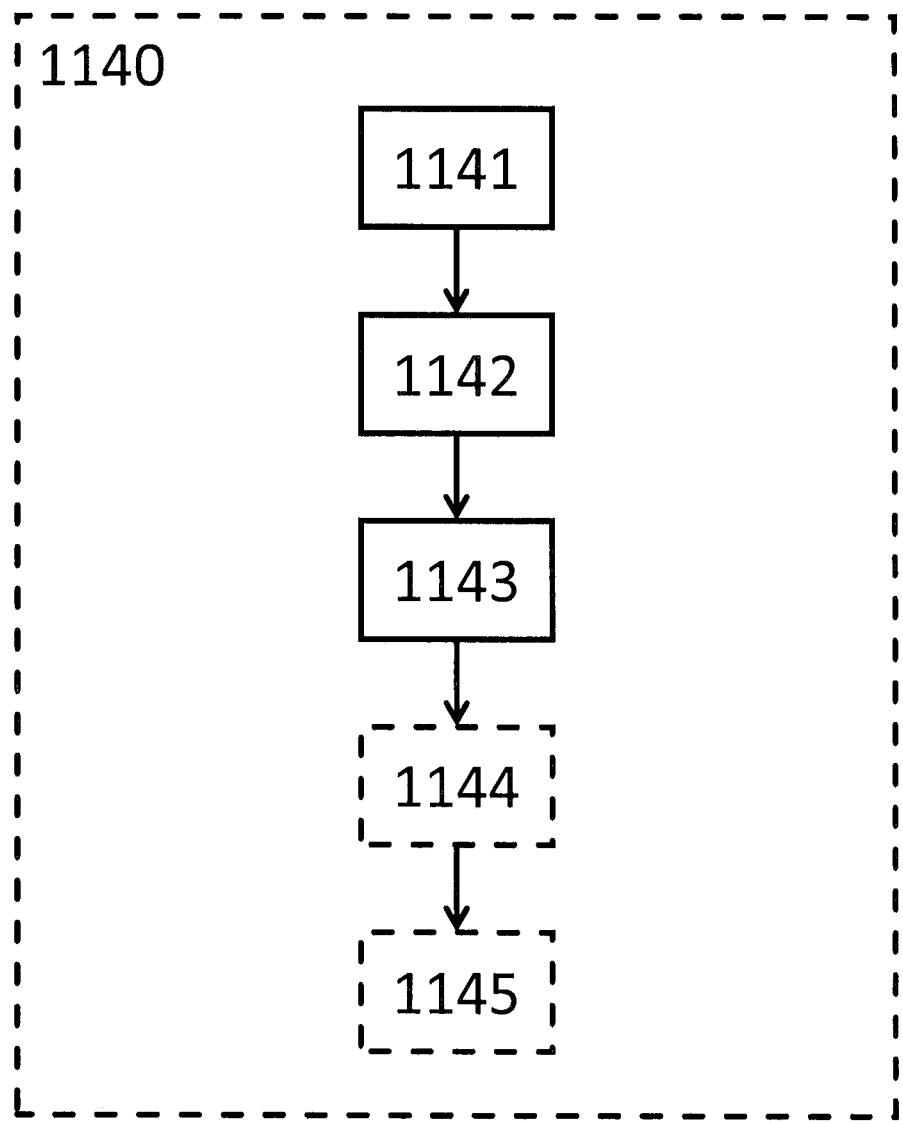
FIG. 12 shows details of step 1140, according to an embodiment.

FIG. 12 shows details of step 1140, according to an embodiment. The continuous source optimized in 1110 may be not directly renderable with certain hardware of the lithographic projection apparatus. In 1141, the continuous source is mapped to a discrete source. The discrete source has a discrete pupil profile resembling the pupil profile of the continuous source and the discrete source is renderable by the hardware of the lithographic projection apparatus (e.g., renderable by a programmable array of mirrors). The discrete source may be calculated using any suitable method based on the pupil profile of the continuous source.

In 1142, the dose of the lithographic process may be optimized. This step allows compensation for dose change due to the mapping of the continuous source to the discrete source.

In 1143, the design layout and the discrete source are co-optimized using the aerial image 36 or resist image 37 obtained by the methods of FIG. 8 and FIG. 10. For example, a cost function may be used in the co-optimization, where the cost function is a function of one or more characteristics of the aerial image 36 or resist image 37.

In optional 1144, the projection optics may be optimized based on the discrete source and design layout co-optimized in 1143. For example, the wavefront may be adjusted, by using, for example, ASML's FlexWave™ optics. This step allows adjustment of the projection optics to accommodate the discrete source and the design layout optimized in step 760. For example, a cost function that is a function of design variables characterizing the projection optics may be used in this optimization.

In optional 1150, the dose of the lithographic process may be optimized by using the discrete source and the design layout co-optimized in 1143.

Figure 13A:
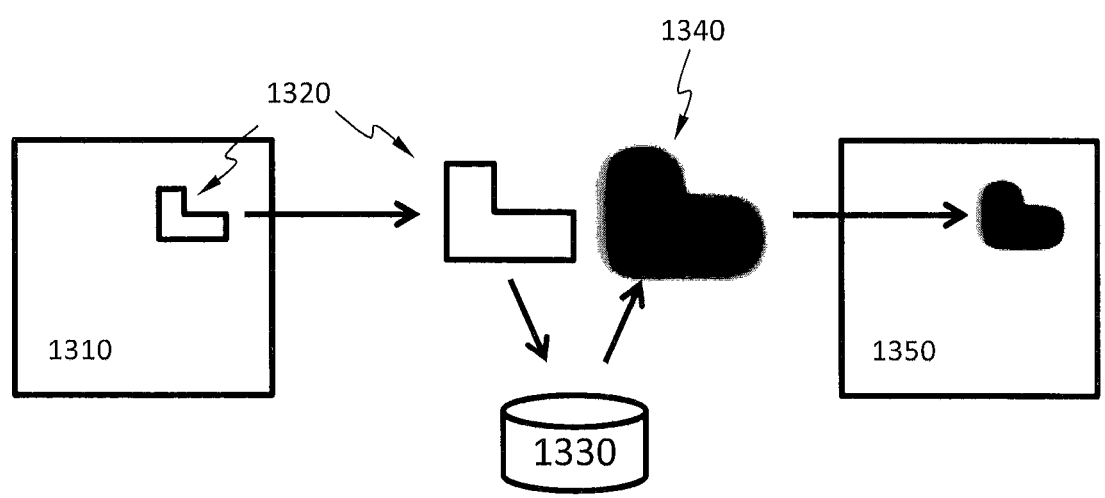
FIG. 13A schematically shows a method of determining a partial image of a design layout formed from a radiation portion propagating along a group of one or more directions, by a lithographic projection apparatus, according to an embodiment.

FIG. 13A schematically shows a method of determining a partial image of a design layout formed from a radiation portion propagating along a group of one or more directions, by a lithographic projection apparatus. Characteristics (e.g., size, shape, height, geometry) of a pattern 1320 of a design layout 1310 may be used along with the group of directions to query a database 1330. The database 1330 may contain partial images of patterns formed from radiation portions propagating along a variety of directions. If a partial image 1340 is found in the database 1330 for the pattern 1320 and the radiation portion propagating along the group of directions, that partial image 1340 may be included in the partial image of the design layout 1310 as the partial image 1350 of the pattern 1320.

Figure 13B:
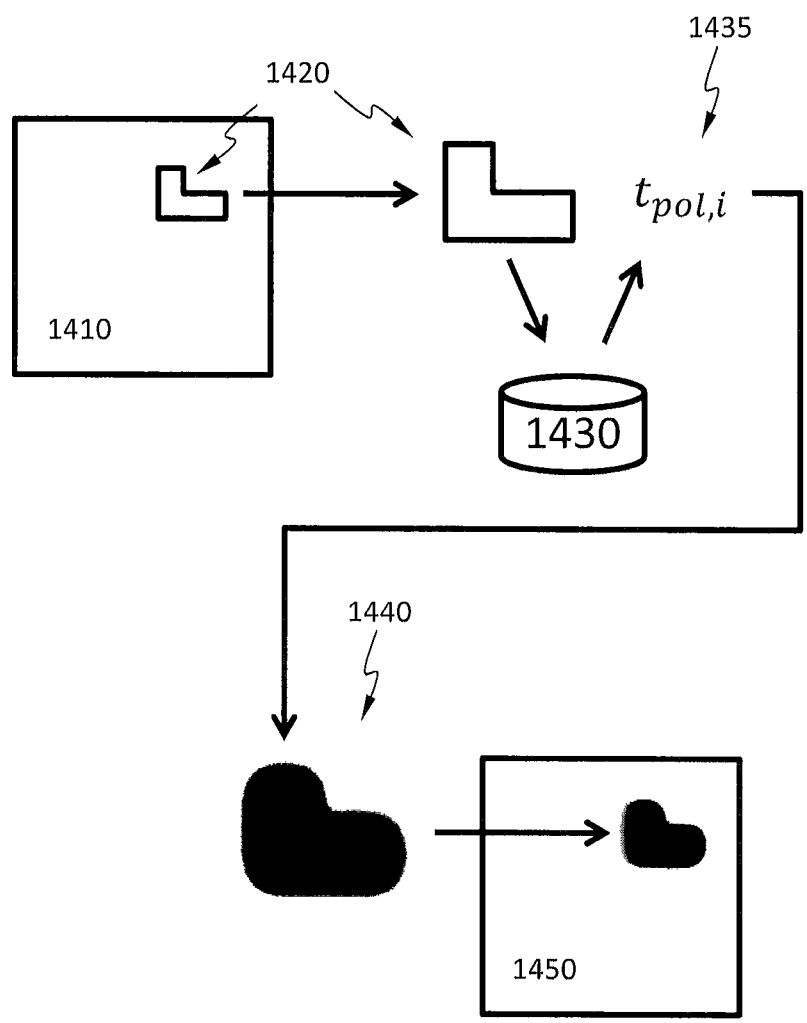
FIG. 13B schematically shows a method of determining a partial image of a design layout formed from a radiation portion propagating along a group of one or more directions, by a lithographic projection apparatus, according to an embodiment.

FIG. 13B schematically shows a method of determining a partial image of a design layout formed from a radiation portion propagating along a group of one or more directions, by a lithographic projection apparatus. Characteristics (e.g., size, shape, height, geometry) of a pattern 1420 of a design layout 1410 may be used along with the group of directions to query a database 1430. The database 1430 may contain transmission functions of patterns for radiation portions propagating along a variety of directions. If a transmission function $t_{pol,i}$ 1435 is found in the database 1430 for the pattern 1420 and the radiation portion propagating along the group of directions, a partial image 1440 of the pattern may be calculated using the transmission function 1435 and included in the partial image 1450 of the design layout 1410 as the partial image of the pattern 1420.

Figure 13C:
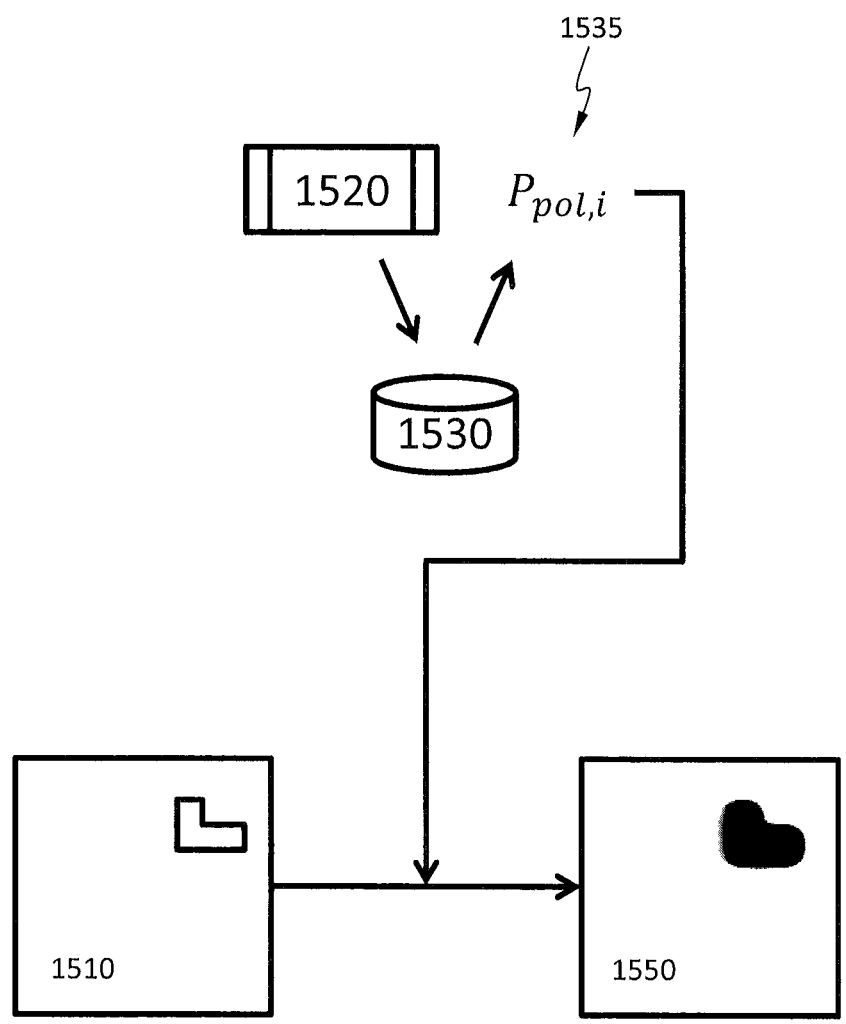
FIG. 13C schematically shows a method of determining a partial image of a design layout formed from a radiation portion propagating along a group of one or more directions, by a lithographic projection apparatus, according to an embodiment.

FIG. 13C schematically shows a method of determining a partial image of a design layout 1510 formed from a radiation portion propagating along a group of one or more directions, by a lithographic projection apparatus. Optical characteristics of projection optics 1520 of a lithographic projection apparatus may be used along with the group of directions to query a database 1530. The database 1530 may contain transmission functions of a variety of projection optics for radiation portions propagating along a variety of directions. If a transmission function $P_{pol,i}$ 1535 of the projection optics 1520 is found in the database 1530 for the radiation portion propagating along the group of directions, a partial image 1550 of the design layout 1510 formed by the projection optics 1520 for the radiation portion propagating along the group of directions may be calculated. The image of the entire design layout 1510 may be calculated by incoherently adding the partial images (e.g., 1550) of the design layout 1510 formed by the projection optics 1520 for all the radiation portions.

Figure 14A:
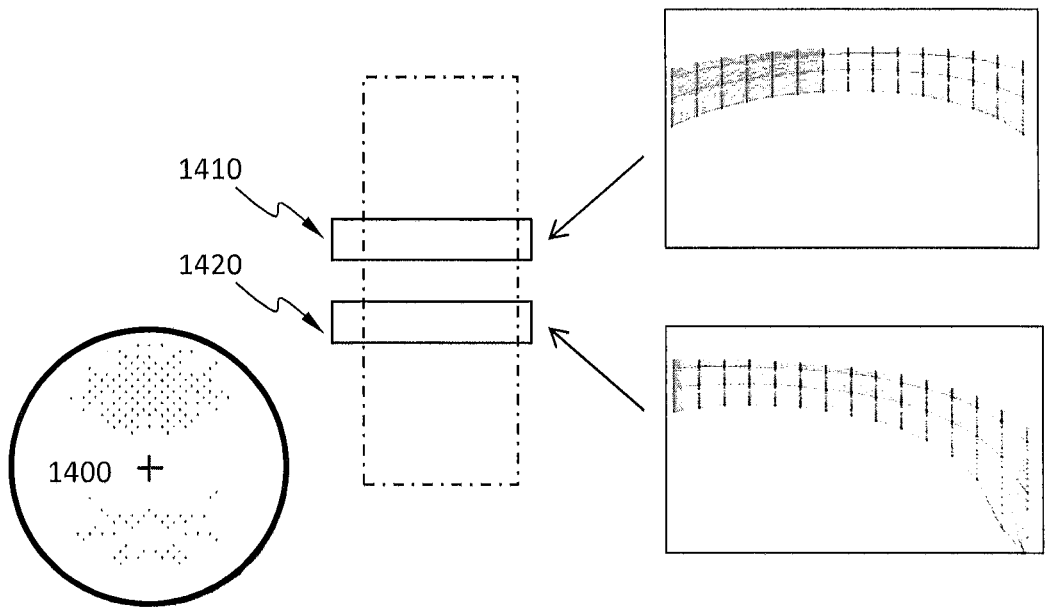
FIG. 14A and FIG. 14B contrast simulation under the single direction assumption with simulation with six propagation directions accounted for, in a discrete source.
Figure 14B:
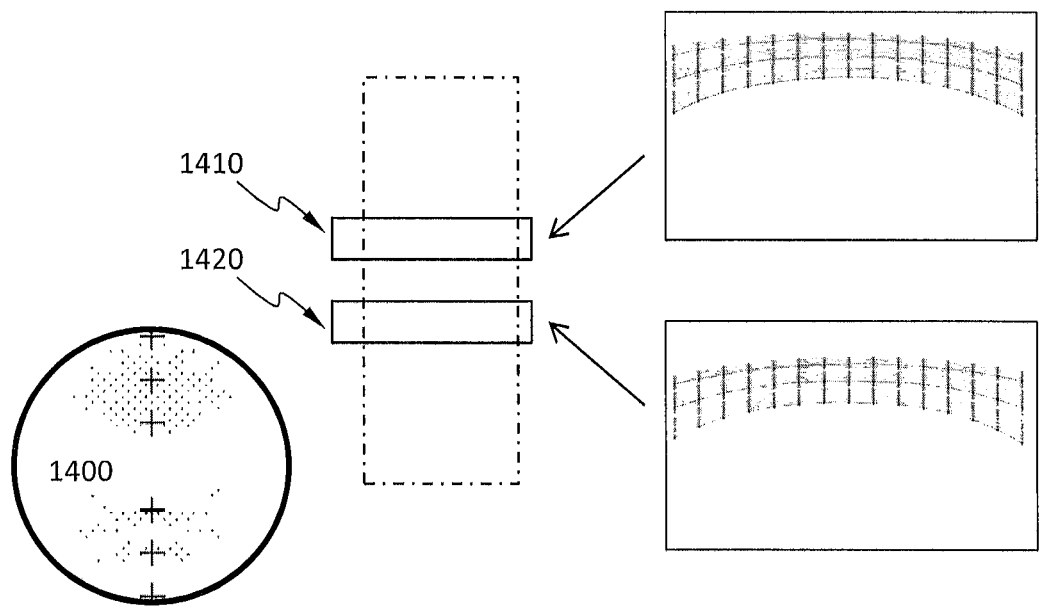

FIG. 14A and FIG. 14B contrast simulation under the single direction assumption with simulation with six propagation directions accounted for, in a discrete source.

FIG. 14A shows Bossung curves (±70 nm delta defocus, ±12% delta dose) obtained from simulated images of two long rectangular features 1410 and 1420. The simulated images are simulated under the same discrete source 1400 under the single direction assumption (the direction marked by the crosshair in the discrete source pupil).

FIG. 14B shows Bossung curves (±70 nm delta defocus, ±12% delta dose) obtained from simulated images of the same two long rectangular features 1410 and 1420, except that the simulated images are simulated under the same discrete source 1400, with six propagation directions (marked by the crosshairs in the discrete source pupil) of radiation from the discrete source 1400 accounted for. The Bossung curves in FIG. 14A are qualitatively dissimilar from the Bossung curves in FIG. 14B, which indicates that the simulation under the single direction assumption is not quite accurate.

According to an embodiment, a computer-implemented method may comprise: determining a first partial image formed from a first radiation portion propagating along a first group of one or more directions, by a lithographic projection apparatus; determining a second partial image formed from a second radiation portion propagating along a second group of one or more directions, by the lithographic projection apparatus; and determining an image by adding the first partial image and the second partial image, wherein the first group of one or more directions and the second group of one or more directions are different.

According to an embodiment, the first group of one or more directions and the second group of one or more directions do not include a same direction.

According to an embodiment, the image is a mask transmittance image.

According to an embodiment, the image is an aerial image.

According to an embodiment, the first and second radiation portions are from a source of the lithographic projection apparatus and the source is a discrete source.

According to an embodiment, first and second radiation portions are from a source of the lithographic projection apparatus and the source is a continuous source.

According to an embodiment, the method may further comprise selecting the first group of one or more directions from a continuous area of a pupil of a source of the lithographic projection apparatus.

According to an embodiment, the first and second radiation portions are from an EUV source.

According to an embodiment, the first partial image and the second partial image are formed by a patterning device.

According to an embodiment, the patterning device is a reflective patterning device.

According to an embodiment, the patterning device is a transmissive patterning device.

According to an embodiment, the first radiation portion and the second radiation portion are oblique to a patterning device.

According to an embodiment, the first partial image and the second partial image are formed at least partially by a structure under a resist layer on a substrate.

According to an embodiment, the method may further comprise adjusting one or more parameters of a patterning device based on the image.

According to an embodiment, the one or more parameters of the patterning device comprise: a number of assist features, a shape of an assist feature, a shape of a main feature, or any combination selected therefrom.

According to an embodiment, the method may further comprise adjusting one or more parameters of the lithographic projection apparatus based on the image.

According to an embodiment, the one or more parameters of the lithographic projection apparatus comprise: a parameter of a source of the lithographic projection apparatus, a parameter of projection optics of the lithographic projection apparatus, a parameter of the first radiation portion, a parameter of the second radiation portion, or any combination selected therefrom.

According to an embodiment, the method may further comprise computing a cost function based on a characteristic of the image.

Figure 15:
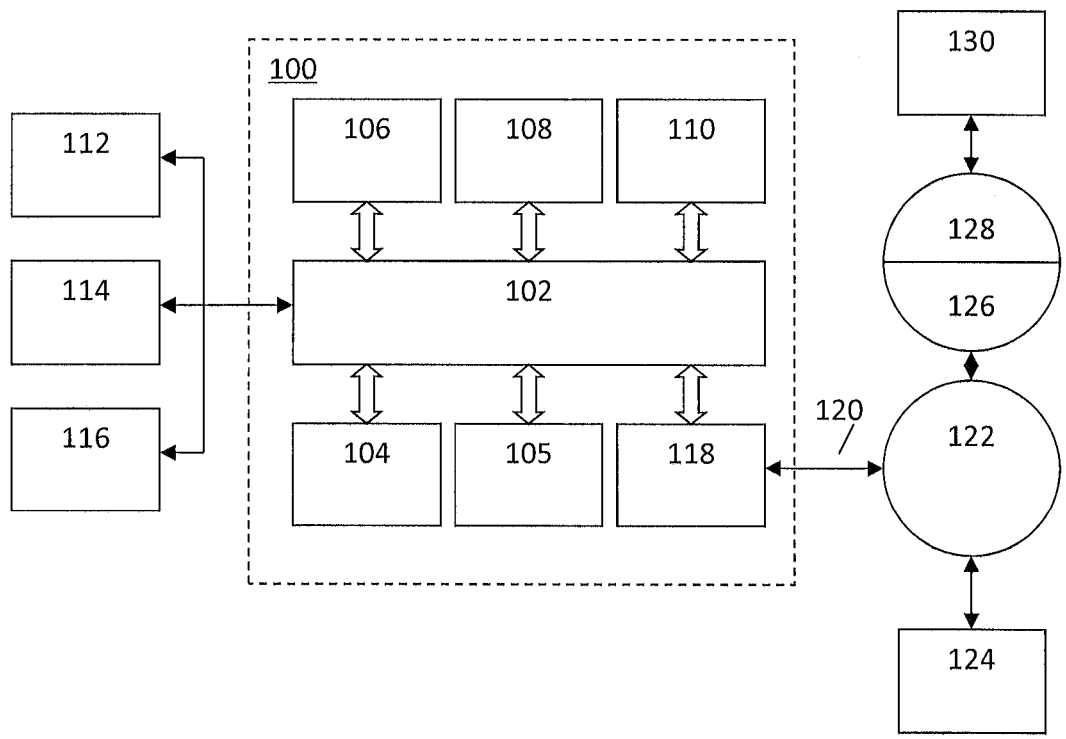
FIG. 15 is a block diagram of an example computer system.

FIG. 15 is an exemplary block diagram that illustrates a computer system 100 which can assist in embodying and/or implementing the methods disclosed herein. Computer system 100 includes a bus 102 or other communication mechanism configured to communicate information, and one or more processor(s) 104 (and 105) coupled with bus 102 to process information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. A touch panel (screen) display may also be used as an input device.

According to one embodiment, portions of the simulation process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also may include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with an embodiment, one such downloaded application provides for the test pattern selection of the embodiment, for example. The received code may be executed by processor 104 as it is received, and/or stored in storage device 110, or other non-volatile storage for later execution. In this manner, computer system 100 may obtain application code in the form of a carrier wave.

Figure 16:
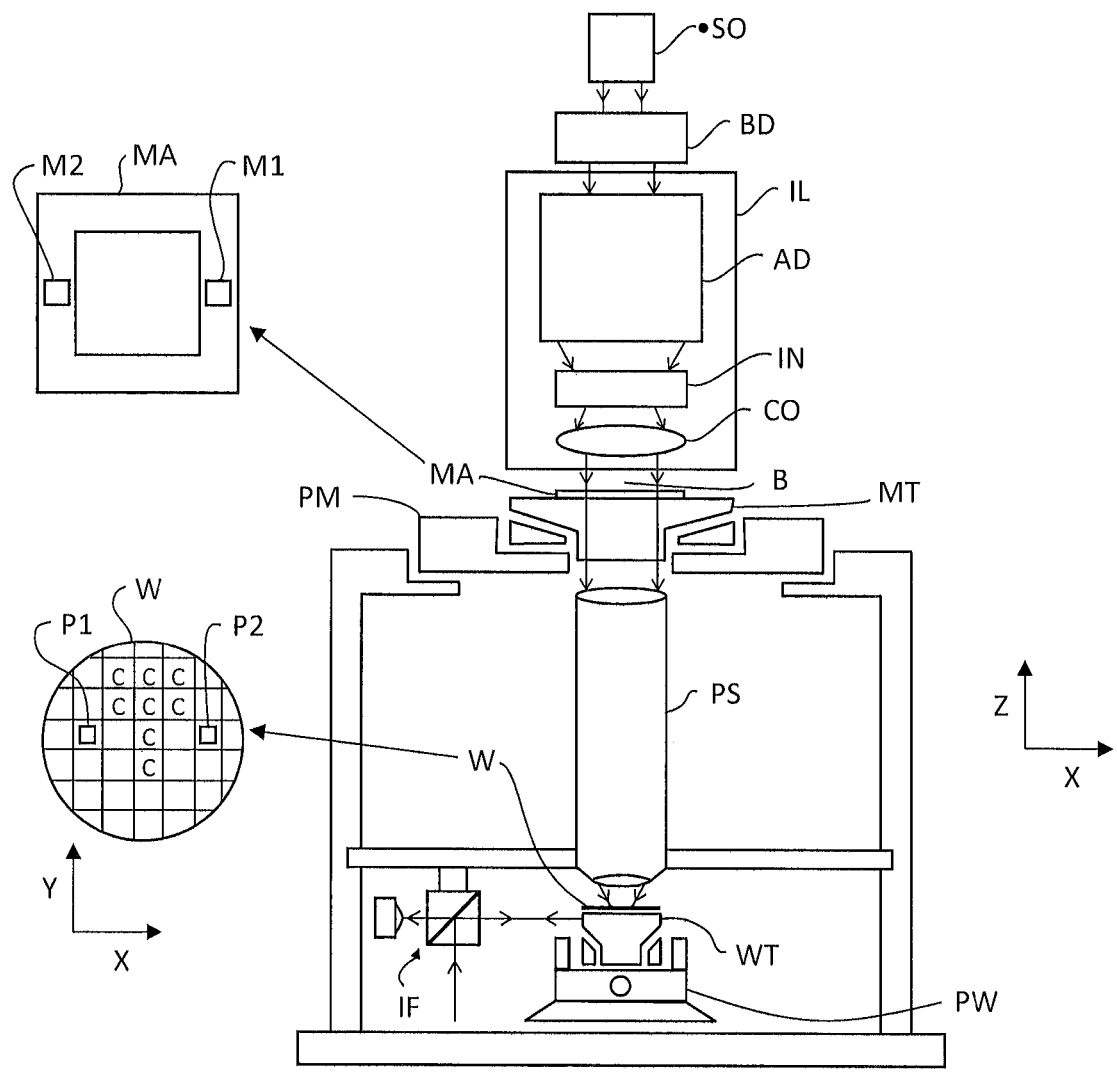
FIG. 16 is a schematic diagram of another lithographic projection apparatus.

FIG. 16 schematically depicts an exemplary lithographic projection apparatus whose performance could be simulated and/or optimized utilizing the methods disclosed herein. The apparatus comprises:
- a radiation system Ex, IL, for supplying a projection beam B of radiation. In this particular case, the radiation system also comprises a radiation source SO;
- a first object table (mask table) MT provided with a patterning device holder for holding a patterning device MA (e.g., a reticle), and connected to first positioning means PM for accurately positioning the patterning device with respect to projection optics PS;
- a second object table (substrate table) WT provided with a substrate holder for holding a substrate W (e.g., a resist coated silicon wafer), and connected to second positioning means PW for accurately positioning the substrate with respect to projection optics PS;
- a projection optics ("lens") PS (e.g., a refractive, catoptric or catadioptric optical system) for imaging an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask).

The source SO (e.g., a mercury lamp or excimer laser) produces a beam of radiation. This beam is fed into an illumination system (illuminator) IL, either directly or after having traversed conditioning means, such as a beam expander or beam delivery system BD, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross section.

It should be noted with regard to FIG. 16 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or F2 lasing).

The beam B subsequently intercepts the patterning device MA, which is held on a patterning device table MT. Having traversed the patterning device MA, the beam B passes through the lens PS, which focuses the beam PS onto a target portion C of the substrate W. With the aid of the second positioning means (and interferometric measuring means IF), the substrate table WT can be moved accurately, e.g. so as to position different target portions C in the path of the beam B. Similarly, the first positioning means can be used to accurately position the patterning device MA with respect to the path of the beam B, e.g., after mechanical retrieval of the patterning device MA from a mask library, or during a scan. In general, movement of the object tables MT, WT will be realized with the aid of a long-stroke module (coarse positioning) and a short-stroke module (fine positioning), which are not explicitly depicted in FIG. 16. However, in the case of a wafer stepper (as opposed to a step-and-scan tool) the patterning device table MT may just be connected to a short stroke actuator, or may be fixed.

Patterning device MA and substrate W may be aligned using alignment marks M1, M2 in the patterning device, and alignment marks P1, P2 on the wafer, as required.

The depicted tool can be used in two different modes:
- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam B;
- In scan mode, essentially the same scenario applies, except that a given target portion C is not exposed in a single "flash". Instead, the patterning device table MT is movable in a given direction (the so called "scan direction", e.g., the y direction) with a speed v, so that the projection beam PB is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include DUV (deep ultra violet) lithography that is capable of producing a 193 nm wavelength with the use of a ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range. Because most materials are absorptive within this range, illumination may be produced by reflective mirrors with a multi-stack of molybdenum and silicon. The multi-stack mirror may have a 40 layer pairs of molybdenum and silicon where the thickness of each layer is about a quarter wavelength. Even smaller wavelengths may be produced with X-ray lithography. Typically, a synchrotron is used to produce an X-ray wavelength. Since most material is absorptive at x-ray wavelengths, a thin piece of absorbing material defines where features would print (positive resist) or not print (negative resist).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

It should be readily apparent to those of ordinary skill in the art that changes and modifications in the form and details may be made without departing from the spirit and scope. It is intended that the appended claims encompass such changes and modification. The concepts disclosed herein may simulate or mathematically model any generic imaging system for imaging sub wavelength features, and may be especially useful with emerging imaging technologies capable of producing wavelengths of an increasingly smaller size.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term "optimizing" and "optimization" as used herein mean adjusting a lithographic projection apparatus such that results and/or processes of lithography have more desirable characteristics, such as higher accuracy of projection of design layouts on a substrate, larger process windows, etc.

Further, the lithographic projection apparatus may be of a type having two or more substrate tables (and/or two or more patterning device tables). In such "multiple stage" devices the additional tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above comprises or can form design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

The invention may further be described using the following clauses:

1. A computer-implemented method comprising:
   determining a first partial image formed from a first radiation portion propagating along a first group of one or more directions from an illumination source of a lithographic projection apparatus and impinging on a patterning device, the first partial image formed by a lithographic projection apparatus;
   determining a second partial image formed from a second radiation portion propagating along a second group of one or more directions from the illumination source of the lithographic projection apparatus and impinging on the patterning device, the second partial image formed by the lithographic projection apparatus; and
   determining, by computer simulation, an image by adding the first partial image and the second partial image,
   wherein the first group of one or more directions and the second group of one or more directions are different.
2. The method of clause 1, wherein the first group of one or more directions and the second group of one or more directions do not include a same direction.
3. The method of clause 1 or clause 2, wherein the image is a mask transmittance image.
4. The method of clause 1 or clause 2, wherein the image is an aerial image.
5. The method of any of clauses 1 to 4, wherein the first and second radiation portions are from a source of the lithographic projection apparatus and the source is a discrete source.
6. The method of any of clauses 1 to 4, wherein the first and second radiation portions are from a source of the lithographic projection apparatus and the source is a continuous source.
7. The method of any of clauses 1 to 6, further comprising selecting the first group of one or more directions from a continuous area of a pupil of a source of the lithographic projection apparatus.
8. The method of any of clauses 1 to 7, wherein the first and second radiation portions are from an EUV source or a DUV source.
9. The method of any of clauses 1 to 8, wherein the first partial image and the second partial image are formed by a patterning device.
10. The method of clause 9, wherein the patterning device is a reflective patterning device.
11. The method of clause 9, wherein the patterning device is a transmissive patterning device.
12. The method of any of clauses 9 to 11, wherein the first radiation portion and the second radiation portion are oblique to the patterning device.
13. The method of any of clauses 1 to 12, wherein the first partial image and the second partial image are formed at least partially by a structure under a resist layer on a substrate.

14. The method of any of clauses 1 to 13, further comprising adjusting a parameter of a patterning device based on the image.
15. The method of clause 14, wherein the parameter of the patterning device comprises: a number of assist features, a shape of an assist feature, a shape of a main feature, or any combination selected therefrom.
16. The method of any of clauses 1 to 15, further comprising adjusting a parameter of the lithographic projection apparatus based on the image.
17. The method of clause 16, wherein the parameter of the lithographic projection apparatus comprises: a parameter of a source of the lithographic projection apparatus, a parameter of projection optics of the lithographic projection apparatus, a parameter of the first radiation portion, a parameter of the second radiation portion, or any combination selected therefrom.
18. The method of any of clauses 1 to 17, further comprising computing a cost function based on a characteristic of the image.
19. The method of any of clauses 1 to 18, wherein determining the image is by incoherently adding the first partial image and the second partial image.
20. A computer-implemented method comprising:
searching in a database for a partial image of a pattern in a design layout, the partial image formed from a radiation portion propagating along a group of one or more directions; and
if the partial image for the pattern is found in the database, constructing a partial image of the design layout, formed from the radiation portion, at least from the partial image of the pattern.
21. A computer-implemented method comprising: searching in a database for a transmission function for a pattern in a design layout, for a radiation portion propagating along a group of one or more directions; and if the transmission function is found in the database, constructing a partial image of the pattern using the transmission function found.
22. The method of clause 21, further comprising constructing a partial image of the design layout using the partial image of the pattern.
23. A computer-implemented method comprising: searching in a database for a transmission function of projection optics of a lithographic projection apparatus, for a radiation portion propagating along a group of one or more directions; and if the transmission function is found in the database, constructing a partial image of a design layout formed by the projection optics, for the radiation portion.
24. The method of clause 23, further comprising constructing an image of the design layout using the partial image of the design layout.
25. A computer program product comprising a computer readable medium having instructions recorded thereon, the instructions when executed by a computer implementing the method of any of the above clauses.

The descriptions above are intended to be illustrative, not limiting. Thus, it will be apparent to one skilled in the art that modifications may be made to the embodiments as described without departing from the scope of the claims set out below.

What is claimed is:

1. A method comprising:
   determining a first partial image formed, or expected to be formed, from a first radiation portion propagating along a first group of a plurality of trajectories in three-dimensional space from an illumination of a lithographic projection apparatus and impinging on a patterning device, the first partial image formed, or expected to be formed, by a lithographic projection apparatus and determined from the plurality of trajectories of the first group;
   determining a second partial image formed, or expected to be formed, from a second radiation portion propagating along a second group of one or more trajectories in three-dimensional space from the illumination of the lithographic projection apparatus and impinging on the patterning device, the second partial image formed, or expected to be formed, by the lithographic projection apparatus and determined from the one or more trajectories of the second group; and
   determining, by computer simulation performed by a hardware computer system, an image that represents multiple propagation directions of radiation from different portions of the illumination by adding the first partial image and the second partial image, wherein the first and/or second partial image, the adding, or both, uses or is generated from a function involving one or more selected from: polarization of radiation, direction of propagation of radiation, a transmission function of the patterning device, or a transmission function of the lithographic projection apparatus and wherein the first group of plurality of trajectories and the second group of one or more trajectories are different.

2. The method of claim 1, wherein the first group of a plurality of trajectories and the second group of one or more trajectories do not include a same trajectory.

3. The method of claim 1, wherein the image corresponds to a mask transmittance image, or wherein the image corresponds to an aerial image.

4. The method of claim 1, wherein the first and second radiation portions are from a discrete illumination, or a continuous illumination.

5. The method of claim 1, further comprising selecting the first group of a plurality of trajectories from a continuous area of a pupil of an illumination system of the lithographic projection apparatus.

6. The method of claim 1, wherein the first partial image and the second partial image are formed, or expected to be formed, by a patterning device.

7. The method of claim 6, wherein the patterning device is a reflective patterning device, or wherein the patterning device is a transmissive patterning device.

8. The method of claim 6, wherein the first radiation portion and the second radiation portion are oblique to the patterning device.

9. The method of claim 1, wherein the first partial image and the second partial image are formed, or expected to be formed, at least partially by a structure under a resist layer on a substrate.

10. The method of claim 1, further comprising adjusting a parameter of a patterning device based on the image, and/or adjusting a parameter of the lithographic projection apparatus based on the image.

11. The method of claim 1, wherein determining the image is by incoherently adding the first partial image and the second partial image.

12. The method of claim 1, further comprising using a computer simulation that accounts for three dimensional topography of a pattern to determine the first partial image and/or second partial image for the pattern.

13. A method comprising:
    searching, by a hardware computer system, in a database of a plurality of partial images for patterns for a partial image of a pattern in a design layout, the partial image formed, or expected to be formed, from a radiation portion propagating, or expected to propagate, along one or more trajectories in three-dimensional space, the database comprising a first partial image determined for radiation propagating along a plurality of trajectories in three-dimensional space of a first group from an illumination of a lithographic projection apparatus and impinging on a patterning device and a second partial image determined for radiation propagating along one or more trajectories in three-dimensional space of a second group from an illumination of a lithographic projection apparatus and impinging on a patterning device, wherein the first group of plurality of trajectories and the second group of one or more trajectories are different; and responsive to the partial image for the pattern being found in the database, constructing, by the hardware computer system, a partial image of the design layout, formed, or expected to be formed, from the radiation portion, at least from the partial image of the pattern, wherein the partial image of the design layout represents multiple propagation directions of radiation from different portions of an illumination of a lithographic projection apparatus and the partial image of the pattern, the constructing, or both, uses or is generated from a function involving one or more selected from: polarization of radiation, direction of propagation of radiation, a transmission function of a patterning device, or a transmission function of a lithographic projection apparatus.

14. A method comprising:

searching, by a hardware computer system, in a database of a plurality of transmission functions for patterns for a transmission function for a pattern in a design layout, for a radiation portion propagating, or expected to propagate, along one or more trajectories in three-dimensional space, the database comprising a first transmission function for radiation propagating along a plurality of trajectories in three-dimensional space of a first group from an illumination of a lithographic projection apparatus and impinging on a patterning device and a second transmission function for radiation propagating along one or more trajectories in three-dimensional space of a second group from an illumination of a lithographic projection apparatus and impinging on a patterning device, wherein the first group of plurality of trajectories and the second group of one or more trajectories are different; and responsive to the transmission function being found in the database, constructing, by the hardware computer system, a partial image of the pattern using the transmission function found, wherein the partial image of the pattern represents multiple propagation directions of radiation from different portions of an illumination of a lithographic projection apparatus and the partial image of the pattern, the construction of the partial image of the pattern, or both, uses or is generated from a function involving one or more selected from: polarization of radiation, direction of propagation of radiation, a transmission function of a patterning device, or a transmission function of a lithographic projection apparatus.

15. The method of claim 14, further comprising constructing a partial image of the design layout using the partial image of the pattern.

16. A computer program product comprising a non-transitory computer readable medium having instructions therein, the instructions, upon execution by a hardware computer system, configured to cause, by the hardware computer system, at least:

determination of a first partial image formed, or expected to be formed, by a lithographic projection apparatus from a first radiation portion propagating, or expected to propagate, along a first group of a plurality of trajectories in three-dimensional space from an illumination of the lithographic projection apparatus and impinging on a patterning device, the first partial image determined from the plurality of trajectories of the first group;

determination of a second partial image formed, or expected to be formed, by the lithographic projection apparatus from a second radiation portion propagating, or expected to propagate, along a second group of one or more trajectories in three-dimensional space from the illumination of the lithographic projection apparatus and impinging on the patterning device, the second partial image determined from the one or more trajectories of the second group; and determination of an image that represents multiple propagation directions of radiation from different portions of the illumination by adding the first partial image and the second partial image, wherein the first and/or second partial image, the adding, or both, uses or is generated from a function involving one or more selected from: polarization of radiation, direction of propagation of radiation, a transmission function of the patterning device, or a transmission function of the lithographic projection apparatus and wherein the first group of a plurality of trajectories and the second group of one or more trajectories are different.

17. The computer program product of claim 6, wherein the first group of a plurality of trajectories and the second group of one or more trajectories do not include a same trajectory.

18. The computer program product of claim 16, wherein determination of the image is by incoherently adding of the first partial image and the second partial image.

19. The computer program product of claim 16, wherein the image corresponds to a mask transmittance image, or wherein the image corresponds to an aerial image.

20. The computer program product of claim 16, wherein the instructions are further configured to cause selection of the first group of a plurality of trajectories from a continuous area of a pupil of an illumination system of the lithographic projection apparatus.

21. The computer program product of claim 16, wherein the instructions are further configured to cause adjustment of a parameter of a patterning device based on the image, and/or adjustment of a parameter of the lithographic projection apparatus based on the image.

22. The computer program product of claim 16, wherein the instructions are further configured to cause the computer system to use a computer simulation that accounts for three dimensional topography of a pattern to determine the first partial image and/or second partial image for the pattern.

23. A computer program product comprising a non-transitory computer readable medium having instructions therein, the instructions, upon execution by a hardware computer system, configured to cause the hardware computer system to at least:

search, in a database of a plurality of partial images for patterns, for a partial image of a pattern in a design layout, the partial image formed, or expected to be formed, from a radiation portion propagating, or expected to propagate, along a group of one or more trajectories in three-dimensional space, the database comprising a first partial image determined for radiation propagating along a plurality of trajectories in three-dimensional space of a first group from an illumination of a lithographic projection apparatus and impinging on a patterning device and a second partial image determined for radiation propagating along one or more trajectories in three-dimensional space of a second group from an illumination of a lithographic projection apparatus and impinging on a patterning device, wherein the first group of plurality of trajectories and the second group of one or more trajectories are different; and responsive to the partial image for the pattern being found in the database, construct a partial image of the design layout, formed, or expected to be formed, from the radiation portion, at least from the partial image of the pattern, wherein the partial image of the design layout represents multiple propagation directions of radiation from different portions of an illumination of a lithographic projection apparatus and the partial image of the pattern, the construction of the partial image of a design layout, or both, uses or is generated from a function involving one or more selected from: polarization of radiation, direction of propagation of radiation, a transmission function of a patterning device, or a transmission function of a lithographic projection apparatus.

24. A computer program product comprising a non-transitory computer readable medium having instructions therein, the instructions, upon execution by a hardware computer system, configured to cause the hardware computer system to at least:

search, in a database of a plurality of transmission functions for patterns, for a transmission function for a pattern in a design layout, for a radiation portion propagating, or expected to propagate, along a group of one or more trajectories in three-dimensional space, the database comprising a first transmission function for radiation propagating along a plurality of trajectories in three-dimensional space of a first group from an illumination of a lithographic projection apparatus and impinging on a patterning device and a second transmission function for radiation propagating along one or more trajectories in three-dimensional space of a second group from an illumination of a lithographic projection apparatus and impinging on a patterning device, wherein the first group of plurality of trajectories and the second group of one or more trajectories are different; and responsive to the transmission function being found in the database, construct a partial image of the pattern using the transmission function found, wherein the partial image of the pattern represents multiple propagation directions of radiation from different portions of an illumination of a lithographic projection apparatus and the partial image of the pattern, the construction of the partial image of the pattern, or both, uses or is generated from a function involving one or more selected from: polarization of radiation, direction of propagation of radiation, a transmission function of a patterning device, or a transmission function of a lithographic projection apparatus.

\* \* \* \* \*